US012801182B2

(12) United States Patent
Choi et al.

(10) Patent No.: US 12,801,182 B2
(45) Date of Patent: Nov. 17, 2026

(54) ELECTRONIC DEVICE COMPRISING ROLLABLE DISPLAY, AND CONTROL METHOD THEREFOR

(71) Applicant: Samsung Electronics Co., Ltd., Suwon-si (KR)

(72) Inventors: Yangsoo Choi, Suwon-si (KR); Jihea Park, Suwon-si (KR); Junghyeob Lee, Suwon-si (KR); Sukdong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 18/916,265

(22) Filed: Oct. 15, 2024

(65) Prior Publication Data

US 2025/0036164 A1 Jan. 30, 2025

Related U.S. Application Data

(63) Continuation of application No. PCT/KR2023/004624, filed on Apr. 5, 2023.

(30) Foreign Application Priority Data

Apr. 15, 2022 (KR) ........................ 10-2022-0047105
Jul. 29, 2022 (KR) ........................ 10-2022-0094449

(51) Int. Cl.
*G06F 1/16* (2006.01)

(52) U.S. Cl.
CPC .......... *G06F 1/1652* (2013.01); *G06F 1/1647* (2013.01); *G06F 1/1683* (2013.01)

(58) Field of Classification Search
CPC .... G06F 1/1652; G06F 1/1647; G06F 1/1683; G06F 1/16; G06F 3/0484; G06F 3/14; H04M 1/02; H04M 1/72454
See application file for complete search history.

(56) References Cited

U.S. PATENT DOCUMENTS 11,494,064 B2 11/2022 Kang et al.
2015/0279328 A1 10/2015 Ong et al.
(Continued)

FOREIGN PATENT DOCUMENTS

CN 112995365 A 6/2021
KR 10-2015-0113732 A 10/2015
(Continued)

OTHER PUBLICATIONS

International Search Report dated Jul. 18, 2023, issued in International Patent Application No. PCT/KR2023/004624.

*Primary Examiner* — Brent D Castiaux
(74) *Attorney, Agent, or Firm* — Jefferson IP Law, LLP

(57) ABSTRACT

An electronic device is provided. The electronic device includes a first housing, a second housing disposed to be movable with respect to the first housing, a rollable display inserted into the first housing or withdrawn from the first housing based on sliding-in or sliding-out of the second housing, a motor driving module disposed inside the first housing or the second housing and configured to move the second housing in a first direction or a second direction, communication circuitry, at least one processor, and memory storing instructions that, when executed by the one or more processors individually or collectively, cause the electronic device to display a first screen in an exposed area of the rollable display, move the second housing in the second direction so that the exposed area of the rollable display is extended, display a shared screen shared with an external electronic device, in a first area corresponding to an exposed area before the rollable display is extended, of extended exposed area, based on a user input received through the first screen, and transmit information, related to the shared screen, to the external electronic device through the communication module.

20 Claims, 19 Drawing Sheets

(56) References Cited

U.S. PATENT DOCUMENTS

| | | | | |
|---|---|---|---|---|
| 2015/0379964 | A1 | 12/2015 | Lee et al. | |
| 2016/0239250 | A1* | 8/2016 | Kim | G06F 3/1454 |
| 2016/0253142 | A1 | 9/2016 | Choi et al. | |
| 2017/0147278 | A1* | 5/2017 | Kwahk | H04N 21/4788 |
| 2021/0191558 | A1 | 6/2021 | Jung et al. | |
| 2022/0035513 | A1* | 2/2022 | Kang | G06F 3/04842 |
| 2022/0057919 | A1 | 2/2022 | Noh et al. | |
| 2022/0147305 | A1 | 5/2022 | Kwahk et al. | |
| 2022/0156029 | A1 | 5/2022 | Lee et al. | |
| 2022/0303373 | A1 | 9/2022 | Kang et al. | |
| 2023/0164262 | A1 | 5/2023 | Yoon et al. | |
| 2023/0188637 | A1 | 6/2023 | Cheon et al. | |

FOREIGN PATENT DOCUMENTS

| | | | |
|---|---|---|---|
| KR | 10-2016-0105242 | A | 9/2016 |
| KR | 10-2187027 | B1 | 12/2020 |
| KR | 10-2256292 | B1 | 5/2021 |
| KR | 10-2022-0012142 | A | 2/2022 |
| KR | 10-2022-0014709 | A | 2/2022 |
| KR | 10-2022-0017193 | A | 2/2022 |
| KR | 10-2022-0064269 | A | 5/2022 |
| KR | 10-2023-0140002 | A | 10/2023 |
| WO | 2021/025198 | A1 | 2/2021 |
| WO | 2022/025308 | A1 | 2/2022 |
| WO | 2022/250309 | A1 | 12/2022 |

* cited by examiner

ELECTRONIC DEVICE COMPRISING ROLLABLE DISPLAY, AND CONTROL METHOD THEREFOR

CROSS-REFERENCE TO RELATED APPLICATION(S)

This application is a continuation application, claiming priority under § 365 (c), of an International application No. PCT/KR2023/004624, filed on Apr. 5, 2023, which is based on and claims the benefit of a Korean patent application number 10-2022-0047105, filed on Apr. 15, 2022, in the Korean Intellectual Property Office, and of a Korean patent application number 10-2022-0094449, filed on Jul. 29, 2022, in the Korean Intellectual Property Office, the disclosure of each of which is incorporated by reference herein in its entirety.

BACKGROUND

1. Field

The disclosure relates to an electronic device including a rollable display and a method for operating the same.

2. Description of Related Art

As the demand for mobile communication increases, or as the degree of integration of electronic devices increases, the portability of electronic devices, such as mobile communication terminals may be increased, and better convenience may be provided in use of multimedia functions. For example, as touchscreen-integrated displays replace traditional mechanical (button-type) keypads, electronic devices may come more compact while functioning as an input device. For example, as the mechanical keypad may be omitted from the electronic device, portability of the electronic device may be improved. As the display area may be expanded to the area which used to be occupied by the mechanical keypad, the electronic device may provide a larger screen while remaining in the same size and weight as when it has the mechanical keypad.

Use of an electronic device with a larger screen may give more convenience in, e.g., web browsing or multimedia playing. A larger display may be adopted to output a larger screen, however, this way may be limited by the portability of the electronic device. According to an embodiment of the disclosure, a display using organic light emitting diodes may secure the portability of the electronic device while providing a larger screen. For example, a display using, or equipped with, organic light emitting diodes may implement a stable operation even if it is made quite thin, so that the display may be applied to an electronic device in a foldable, bendable or rollable form.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device including a rollable display and a method for operating the same.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing disposed to be movable with respect to the first housing, a rollable display inserted into or drawn out of the first housing based on slide-in or slide-out of the second housing, a motor driving module disposed inside the first housing or the second housing and configured to move the second housing in a first direction or a second direction, a communication module, memory storing one or more computer programs, and one or more processors communicatively coupled to the first housing, the second housing, the rollable display, the motor driving module, the communication module, and the memory, wherein the one or more computer programs include computer-executable instructions that, when executed by the one or more processors individually or collectively, cause the electronic device to display a first screen in an exposed area of the rollable display, move the second housing in the second direction so that the exposed area of the rollable display is extended, display a shared screen shared with an external electronic device in a first area corresponding to an exposed area before the rollable display is extended, of extended exposed area, based on a user input received through the first screen, and transmit information related to the shared screen to the external electronic device through the communication module.

According to an embodiment of the disclosure, one or more computer programs further include computer-executable instructions that, when executed by the one or more processors individually or collectively, cause the electronic device to display a non-shared screen in a second area of extended exposed area other than the first area.

According to an embodiment of the disclosure, the information related to the shared screen includes size information about the shared screen for extending a rollable display of the external electronic device based on a size of the shared screen.

According to an embodiment of the disclosure, one or more computer programs further include computer-executable instructions that, when executed by the one or more processors individually or collectively, cause the electronic device to display a first shared screen in the first area, and display a second shared screen in a second area of extended exposed area other than the first area.

According to an embodiment of the disclosure, one or more computer programs further include computer-executable instructions that, when executed by the one or more processors individually or collectively, cause the electronic device to switch a screen displayed in the first area and a screen displayed in the second area if a set input is received.

In accordance with another aspect of the disclosure, a method of controlling an electronic device including a first housing, a second housing disposed to be movable with respect to the first housing, and a rollable display inserted into or drawn out of the first housing, based on slide-in or slide-out of the second housing is provided. The method includes displaying a first screen in an exposed area of the rollable display, moving the second housing in a second direction so that the exposed area of the rollable display is extended, displaying a shared screen shared with an external electronic device in a first area corresponding to an exposed area before the rollable display is extended, of extended exposed area, based on a user input received through the first screen, and transmitting information related to the shared screen to the external electronic device, wherein the displaying displays a non-shared screen in a second area of extended exposed area other than the first area.

According to an embodiment of the disclosure, the information related to the shared screen includes size information about the shared screen for extending a rollable display of the external electronic device based on a size of the shared screen.

According to an embodiment of the disclosure, the displaying displays a first shared screen in the first area, and display a second shared screen in a second area of extended exposed area other than the first area.

According to an embodiment of the disclosure, the method further includes switching a screen displayed in the first area and a screen displayed in the second area if a set input is received.

In accordance with another aspect of the disclosure, an electronic device is provided. The electronic device includes a first housing, a second housing disposed to be movable with respect to the first housing, a rollable display inserted into or drawn out of the first housing based on slide-in or slide-out of the second housing, a motor driving module disposed inside the first housing or the second housing and configured to move the second housing in a first direction or a second direction, a communication module, memory one or more computer programs, and one or more processors communicatively coupled to the first housing, the second housing, the rollable display, the motor driving module, the communication module, and the memory, display a first screen in an exposed area of the rollable display, move the second housing in the second direction so that the exposed area of the rollable display is extended, display a shared screen shared with an external electronic device in a second area other than a first area corresponding to an exposed area before the rollable display is extended, of extended exposed area, based on a user input received through the first screen, and transmit information related to the shared screen to the external electronic device through the communication module.

According to an embodiment of the disclosure, the one or more computer programs further include computer-executable instructions that, when executed by the one or more processors individually or collectively, cause the electronic device to display a non-shared screen in the first area.

According to an embodiment of the disclosure, the information related to the shared screen includes size information about the shared screen for extending a rollable display of the external electronic device based on a size of the shared screen.

According to an embodiment of the disclosure, the one or more computer programs further include computer-executable instructions that, when executed by the one or more processors individually or collectively, cause the electronic device to switch a screen displayed in the first area and a screen displayed in the second area if a set input is received.

In accordance with another aspect of the disclosure, a method of controlling an electronic device including a first housing, a second housing disposed to be movable with respect to the first housing, and a rollable display inserted into or drawn out of the first housing, based on slide-in or slide-out of the second housing is provided. The method includes displaying a first screen in an exposed area of the rollable display.

According to an embodiment of the disclosure, the method includes moving the second housing in a second direction so that the exposed area of the rollable display is extended.

According to an embodiment of the disclosure, the method includes displaying a shared screen shared with an external electronic device in a second area other than a first area corresponding to an exposed area before the rollable display is extended, of extended exposed area, based on a user input received through the first screen.

According to an embodiment of the disclosure, the method includes transmitting information related to the shared screen to the external electronic device.

According to an embodiment of the disclosure, the displaying displays a non-shared screen in the first area.

According to an embodiment of the disclosure, the information related to the shared screen includes size information about the shared screen for extending a rollable display of the external electronic device based on a size of the shared screen.

According to an embodiment of the disclosure, the method further includes switching a screen displayed in the first area and a screen displayed in the second area if a set input is received.

In accordance with another aspect of the disclosure, one or more non-transitory computer-readable storage media storing computer-executable instructions that, when executed by one or more processors individually or collectively, cause an electronic device to perform operations of controlling the electronic device including a first housing, a second housing disposed to be movable with respect to the first housing, a rollable display inserted into or drawn out of the first housing based on slide-in or slide-out of the second housing are provided. The operations include displaying a first screen in an exposed area of the rollable display, moving the second housing in a second direction so that the exposed area of the rollable display is extended, and displaying a shared screen shared with an external electronic device in a first area corresponding to an exposed area before the rollable display is extended, of extended exposed area, based on a user input received through the first screen, and transmitting information related to the shared screen to the external electronic device.

According to an embodiment of the disclosure, the one or more programs is configured to enable the electronic device to move the second housing in the second direction so that the exposed area of the rollable display is extended.

According to an embodiment of the disclosure, the one or more programs is configured to enable the electronic device to display a shared screen shared with an external electronic device in a first area corresponding to an exposed area before the rollable display is extended, of extended exposed area, based on a user input received through the first screen.

According to an embodiment of the disclosure, the one or more programs is configured to enable the electronic device to transmit information related to the shared screen to the external electronic device through the communication module.

According to an embodiment of the disclosure, the one or more programs is configured to enable the electronic device to display a non-shared screen in a second area of extended exposed area other than the first area.

According to an embodiment of the disclosure, the information related to the shared screen includes size information about the shared screen for extending a rollable display of the external electronic device based on a size of the shared screen.

According to an embodiment of the disclosure, the one or more programs is configured to enable the electronic device to display a first shared screen in the first area, and display a second shared screen in a second area of extended exposed area other than the first area.

According to an embodiment of the disclosure, the one or more programs is configured to enable the electronic device to switch a screen displayed in the first area and a screen displayed in the second area if a set input is received.

In accordance with another aspect of the disclosure, one or more non-transitory computer-readable storage media computer-executable instructions that, when executed by one or more processors individually or collectively, cause an electronic device to perform operations of controlling the electronic device including a first housing, a second housing disposed to be movable with respect to the first housing, and a rollable display inserted into or drawn out of the first housing, based on slide-in or slide-out of the second housing are provided. The operations include displaying a first screen in an exposed area of the rollable display, moving the second housing in a second direction so that the exposed area of the rollable display is extended, displaying a shared screen shared with an external electronic device in a first area corresponding to an exposed area before the rollable display is extended, of extended exposed area, based on a user input received through the first screen, and transmitting information related to the shared screen to the external electronic device.

According to an embodiment of the disclosure, the one or more programs is configured to enable the at least one processor to move the second housing in the second direction so that the exposed area of the rollable display is extended.

According to an embodiment of the disclosure, the one or more programs is configured to enable the at least one processor to display a shared screen shared with an external electronic device in a second area other than a first area corresponding to an exposed area before the rollable display is extended, of extended exposed area, based on a user input received through the first screen.

According to an embodiment of the disclosure, the one or more programs is configured to enable the electronic device to transmit information related to the shared screen to the external electronic device through the communication module.

According to an embodiment of the disclosure, the one or more programs is configured to enable the electronic device to display a non-shared screen in the first area.

According to an embodiment of the disclosure, the information related to the shared screen includes size information about the shared screen for extending a rollable display of the external electronic device based on a size of the shared screen.

According to an embodiment of the disclosure, the one or more programs is configured to enable the electronic device to switch a screen displayed in the first area and a screen displayed in the second area if a set input is received.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ M chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
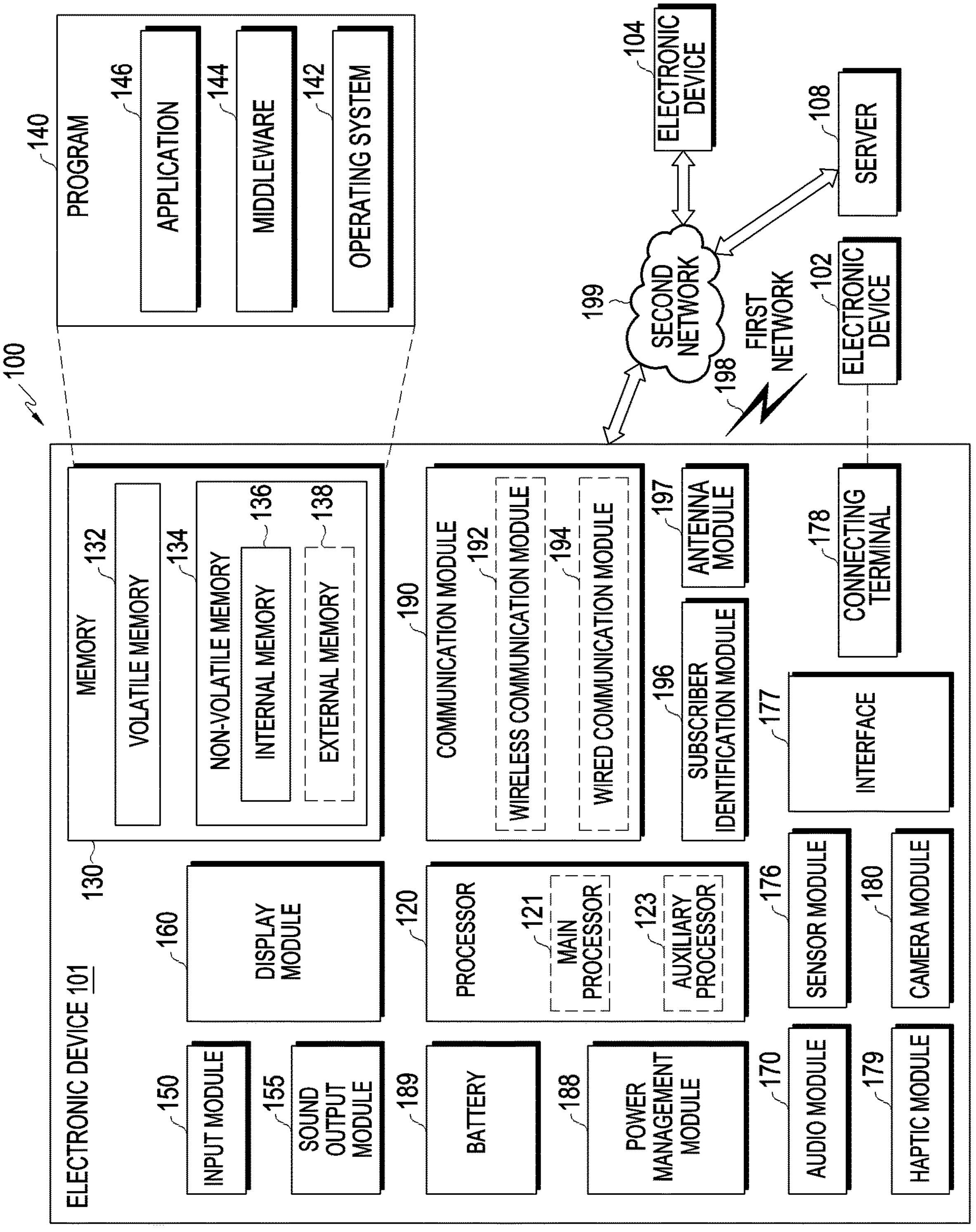
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with at least one of an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment of the disclosure, at least one (e.g., the connecting terminal 178) of the components may be omitted from the electronic device 101, or one or more other components may be added in the electronic device 101. According to an embodiment of the disclosure, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor configured to detect a touch, or a pressure sensor configured to measure the intensity of a force generated by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment of the disclosure, the antenna module 197 may include one antenna including a radiator formed of a conductor or conductive pattern formed on a substrate (e.g., a printed circuit board (PCB)). According to an embodiment of the disclosure, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment of the disclosure, other parts (e.g., radio frequency integrated circuit (RFIC)) than the radiator may be further formed as part of the antenna module 197.

According to an embodiment of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment of the disclosure, all or some of operations to be executed at the electronic device 101 may be executed at one or more of the external electronic devices 102 or 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an Internet-of-things (IOT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or health-care) based on 5G communication technology or IoT-related technology.

Figure 2:
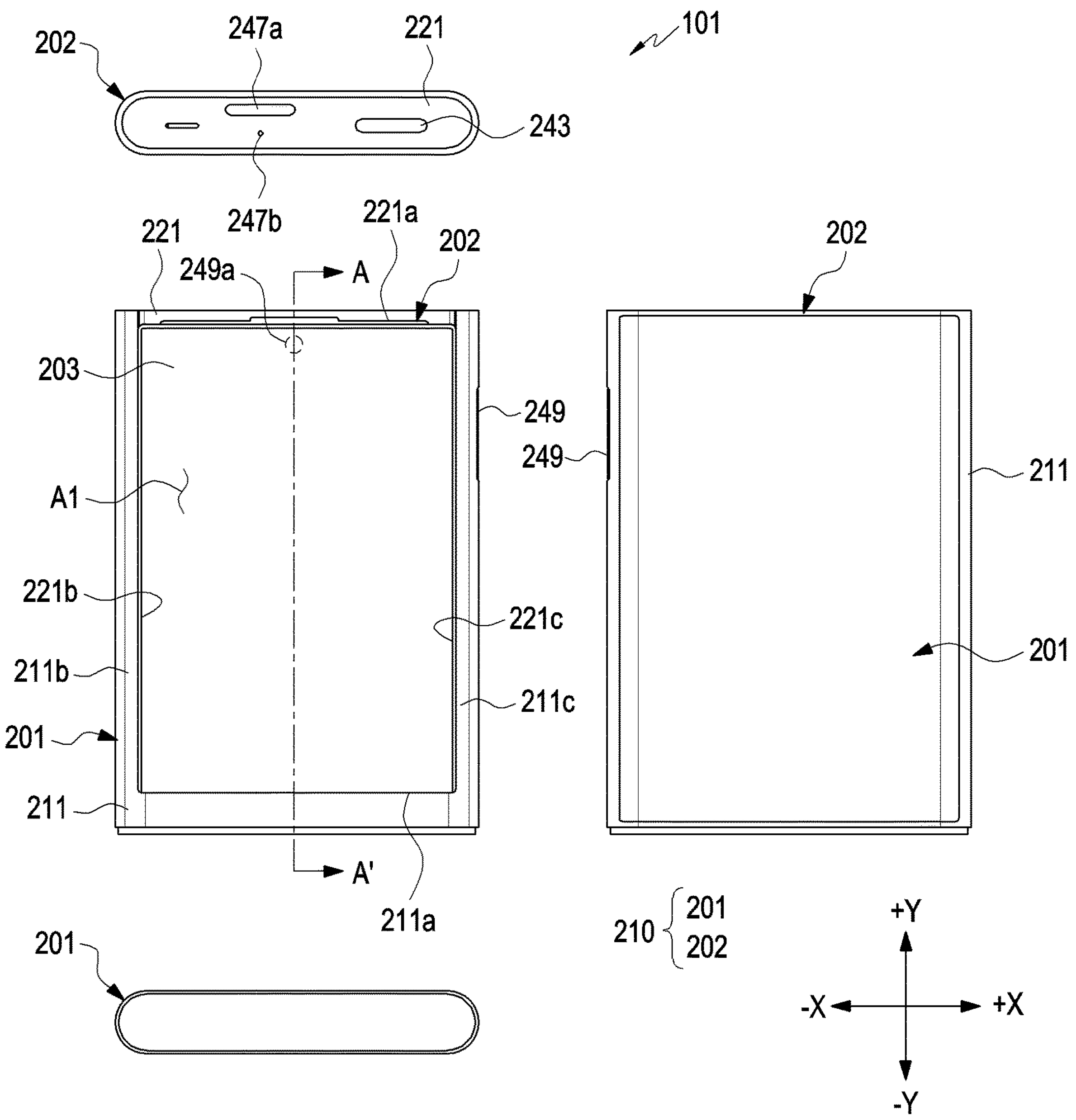
FIG. 2 is a view illustrating a state in which a second display area of a display is received in a housing according to an embodiment of the disclosure.

FIG. 2 is a view illustrating a state in which a second display area of a display is received in a housing according to an embodiment of the disclosure.

Figure 3:
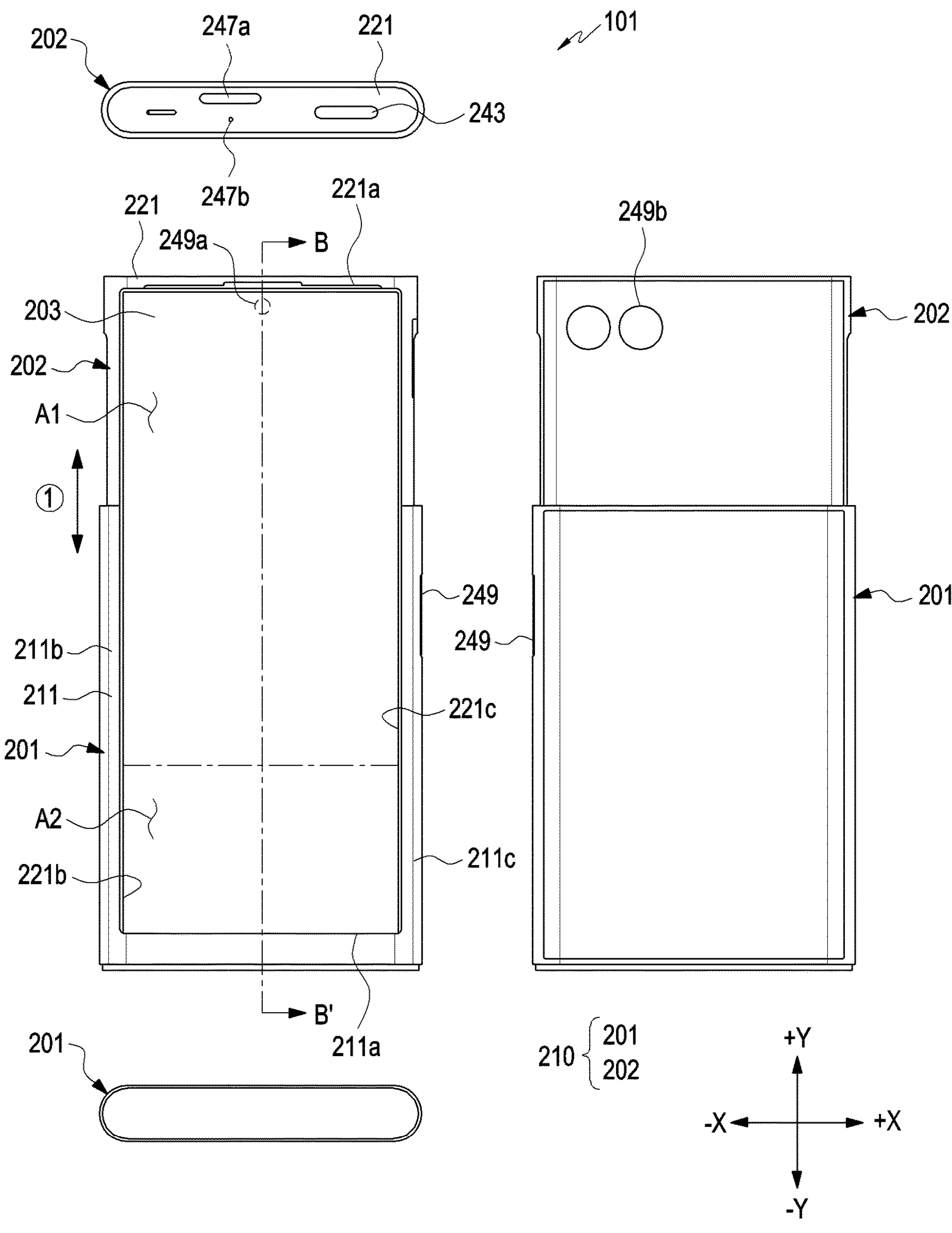
FIG. 3 is a view illustrating a state in which a second display area of a display is exposed to the outside of a housing according to an embodiment of the disclosure.

FIG. 3 is a view illustrating a state in which a second display area of a display is exposed to the outside of a housing according to an embodiment of the disclosure.

FIGS. 2 and 3 illustrate a structure in which a display 203 (e.g., flexible display or rollable display) is extended in the length direction (e.g., +Y direction) when the electronic device 101 is viewed from the front. However, the extending direction of the display 203 is not limited to one direction (e.g., +Y direction). For example, the extending direction of the display 203 may be changed in design to be extendable in the upper direction (+Y direction), right direction (e.g., +X direction), left direction (e.g., −X direction), and/or lower direction (e.g., −Y direction).

The state shown in FIG. 2 may be referred to as a closed state of the electronic device 101 or housing 210 and a slide-in state of the display 203.

The state shown in FIG. 3 may be referred to as an opened state of the electronic device 101 or housing 210 and a slide-out state of the display 203.

Referring to FIGS. 2 and 3, the electronic device 101 may include a housing 210. The housing 210 may include a first housing 201 and a second housing 202 disposed to be movable relative to the first housing 201. According to an embodiment of the disclosure, the electronic device 101 may be interpreted as having a structure in which the first housing 201 is disposed to be slidable with respect to the second housing 202. According to an embodiment of the disclosure, the second housing 202 may be disposed to perform reciprocating motion by a predetermined distance in a predetermined direction with respect to the first housing 201, for example, a direction indicated by an arrow ①.

According to an embodiment of the disclosure, the second housing 202 may be referred to as a slide portion or a slide housing, and may be movable relative to the first housing 201. According to an embodiment of the disclosure, the second housing 202 may receive various electrical/electronic components, such as a circuit board or a battery.

According to an embodiment of the disclosure, the first housing 201 may have, disposed therein, a motor, a speaker, a sim socket, and/or a sub circuit board electrically connected with a main circuit board. The second housing 202 may receive a main circuit board on which electric components, such as an application processor (AP) and a communication processor (CP) are mounted.

According to an embodiment of the disclosure, the first housing 201 may include a first cover member 211 (e.g., a main case). The first cover member 211 may include a 1-1$^{th}$ sidewall 211*a*, a 1-2$^{th}$ sidewall 211*b* extending from the 1-1$^{th}$ sidewall 211*a*, and a 1-3$^{th}$ sidewall 211*c* extending from the 1-1$^{th}$ sidewall 211*a* and substantially parallel to the 1-2$^{th}$ sidewall 211*b*. According to an embodiment of the disclosure, the 1-2$^{th}$ sidewall 211*b* and the 1-3$^{th}$ sidewall 211*c* may be formed substantially perpendicular to the 1-1$^{th}$ sidewall 211*a*.

According to an embodiment of the disclosure, the 1-1$^{th}$ sidewall 211*a*, 1-2$^{th}$ sidewall 211*b*, and 1-3$^{th}$ sidewall 211*c* of the first cover member 211 may be formed to have a side opening (e.g., front opening) to receive (or surround) at least a portion of the second housing 202. For example, at least a portion of the second housing 202 may be surrounded by the first housing 201 and be slid in the direction parallel to the first surface (e.g., the first surface F1 of FIG. 4), e.g., arrow ① direction, while being guided by the first housing 201. According to an embodiment of the disclosure, the 1-1$^{th}$ sidewall 211*a*, the 1-2$^{th}$ sidewall 211*b*, and/or the 1-3$^{th}$ sidewall 211*c* of the first cover member 211 may be integrally formed. According to an embodiment of the disclosure, the 1-1$^{th}$ sidewall 211*a*, the 1-2$^{th}$ sidewall 211*b*, and/or the 1-3$^{th}$ sidewall 211*c* of the first cover member 211 may be formed as separate structures and be combined or assembled.

According to an embodiment of the disclosure, the first cover member 211 may be formed to surround at least a portion of the display 203. For example, at least a portion of the display 203 may be formed to be surrounded by the 1-1$^{th}$ sidewall 211*a*, the 1-2$^{th}$ sidewall 211*b*, and/or the 1-3$^{th}$ sidewall 211*c* of the first cover member 211.

According to an embodiment of the disclosure, the second housing 202 may include a second cover member 221 (e.g., a slide plate). The second cover member 221 may have a plate shape and include a first surface (e.g., the first surface F1 of FIG. 4) supporting internal components. For example, the second cover member 221 may support at least a portion of the display 203 (e.g., a first display area A1). According to an embodiment of the disclosure, the second cover member 221 may be referred to as a front cover.

According to an embodiment of the disclosure, the second cover member 221 may include a 2-1$^{th}$ sidewall 221*a*, a 2-2$^{th}$ sidewall 221*b* extending from the 2-1$^{th}$ sidewall 221*a*, and a 2-3$^{th}$ sidewall 221*c* extending from the 2-1$^{th}$ sidewall 221*a* and substantially parallel to the 2-2$^{th}$ sidewall 221*b*. According to an embodiment of the disclosure, the 2-2$^{th}$ sidewall 221*b* and the 2-3$^{th}$ sidewall 221*c* may be formed substantially perpendicular to the 2-1$^{th}$ sidewall 221*a*.

According to an embodiment of the disclosure, as the second housing 202 moves in a first direction (e.g., direction ①) parallel to the 1-2$^{th}$ sidewall 211*b* or the 1-2$^{th}$ sidewall 211*c*, the housing 210 may form an opened state and a closed state. In the closed state, the second housing 202 may be positioned at a first distance from the 1-1$^{th}$ sidewall 211*a* and, in the opened state, the second housing 202 may be moved to be positioned at a second distance larger than the first distance from the 1-1$^{th}$ sidewall 211*a*. In some embodiments of the disclosure, in the closed state, the first housing 201 may surround a portion of the 2-1$^{th}$ side wall 221*a*.

According to an embodiment of the disclosure, the electronic device 101 may include a display 203, a key input device 245, a connector hole 243, audio modules 247*a* and 247*b*, or camera modules 249*a* and 249*b*. According to an embodiment of the disclosure, the electronic device 101 may further include an indicator (e.g., a light emitting diode (LED) device) or various sensor modules.

According to an embodiment of the disclosure, the display 203 may include the first display area A1 configured to remain exposed and a second display area A2 configured to be exposed to the outside of the electronic device 101 based on the slide of the second housing 202. According to an embodiment of the disclosure, the first display area A1 may be disposed on the second housing 202. For example, the first display area A1 may be disposed on the second cover member 221 of the second housing 202. According to an embodiment of the disclosure, the second display area A2 may extend from the first display area A1, and as the second housing 202 slides relative to the first housing 201, the second display area A2 may be received in the first housing 201 (e.g., the slide-in state) or be visually exposed to the outside of the electronic device 101 (e.g., the slide-out state).

According to an embodiment of the disclosure, the second display area A2 may be received in the space positioned inside the first housing 201 or exposed to the outside of the electronic device 101 while being substantially guided by one area (e.g., a curved surface 213*a* of FIG. 4) of the first housing 201. According to an embodiment of the disclosure, the second display area A2 may move based on a slide of the second housing 202 in the first direction (e.g., the direction indicated by the arrow ①. For example, while the second housing 202 slides, a portion of the second display area A2 may be deformed into a curved shape in a position corresponding to the curved surface 213*a* of the first housing 201.

According to an embodiment of the disclosure, when viewed from above the second cover member 221 (e.g., front cover), if the electronic device 101 changes from the closed state to opened state (e.g., if the second housing 202 slides to extend from the first housing 201), the second display area A2 may be gradually exposed to the outside of the first housing 201 and, together with the first display area A1, form a substantially flat surface. According to an embodiment of the disclosure, the display 203 may be coupled with or disposed adjacent to a touch detection circuit, a pressure sensor capable of measuring the strength (pressure) of touches, and/or a digitizer for detecting a magnetic field-type stylus pen. According to an embodiment of the disclosure, irrespective of the closed state or opened state of the housing 210, the exposed portion of the second display area A2 may be positioned on a portion (e.g., the curved surface 213*a* of FIG. 4) of the first housing, and a portion of the second display area A2 may remain in the curved shape in the position corresponding to the curved surface 213*a*.

According to an embodiment of the disclosure, the key input device 245 may be positioned in one area of the first housing 201. Depending on the appearance and the state of use, the electronic device 101 may be designed to omit the illustrated key input device 245 or to include additional key input device(s). According to an embodiment of the disclosure, the electronic device 101 may include a key input device (not shown), e.g., a home key button or a touchpad disposed around the home key button. According to an embodiment of the disclosure, at least a portion of the key input device 245 may be disposed on the 1-1$^{th}$ sidewall 211*a*, the 1-2$^{th}$ sidewall 211*b*, or the 1-3$^{th}$ sidewall 211*c* of the first housing 201.

According to an embodiment of the disclosure, the connector hole 243 may be omitted or may receive a connector (e.g., a universal serial bus (USB) connector) for transmitting and receiving power and/or data with an external electronic device. According to an embodiment (not shown) of the disclosure, the electronic device 101 may include a plurality of connector holes 243, and some of the plurality of connector holes 243 may function as connector holes for transmitting/receiving audio signals with an external electronic device. In the illustrated embodiment of the disclosure, the connector hole 243 is disposed in the second housing 202, but is not limited thereto, the connector hole 243 or a connector hole not shown may be disposed in the first housing 201.

According to an embodiment of the disclosure, the audio modules 247*a* and 247*b* may include at least one speaker hole 247*a* or at least one microphone hole 247*b*. One of the speaker holes 247*a* may be provided as a receiver hole for voice calls, and the other may be provided as an external speaker hole. The electronic device 101 may include a microphone for obtaining sound, and the microphone may obtain external sound of the electronic device 101 through the microphone hole 247*b*. According to an embodiment of the disclosure, the electronic device 101 may include a plurality of microphones to detect the direction of sound. According to an embodiment of the disclosure, the electronic device 101 may include an audio module in which the speaker hole 247*a* and the microphone hole 247*b* are implemented as one hole or may include a speaker without the speaker hole 247*a* (e.g., a piezo speaker).

Figure 5A:
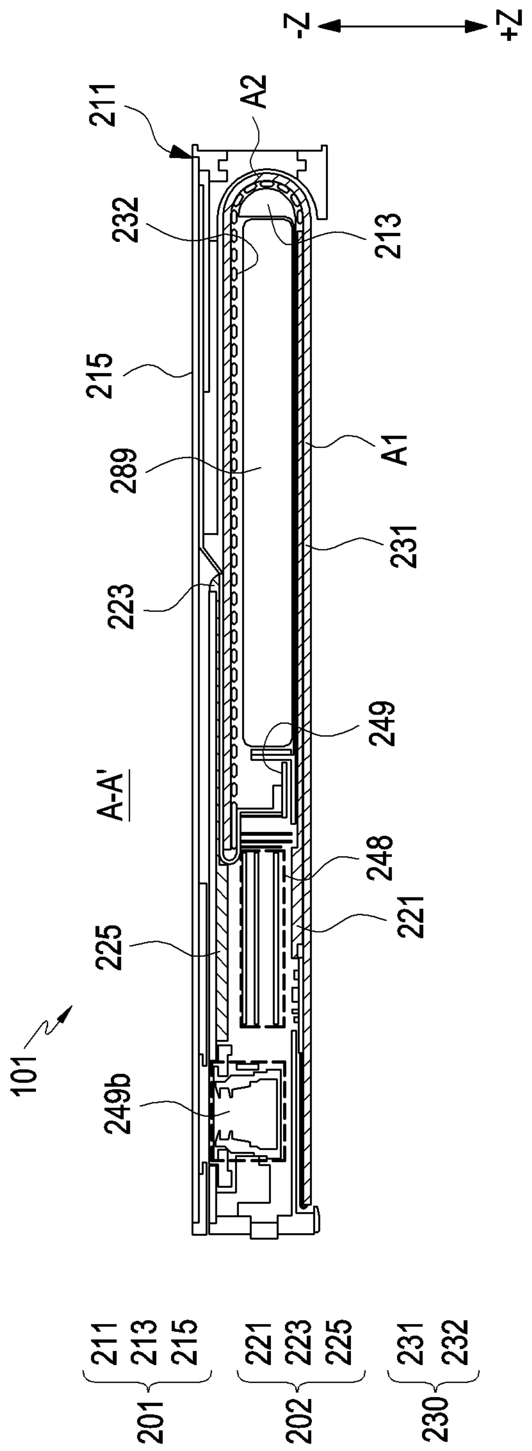
FIG. 5A is a cross-sectional view taken along line A-A' of FIG. 2 according to an embodiment of the disclosure.
Figure 5B:
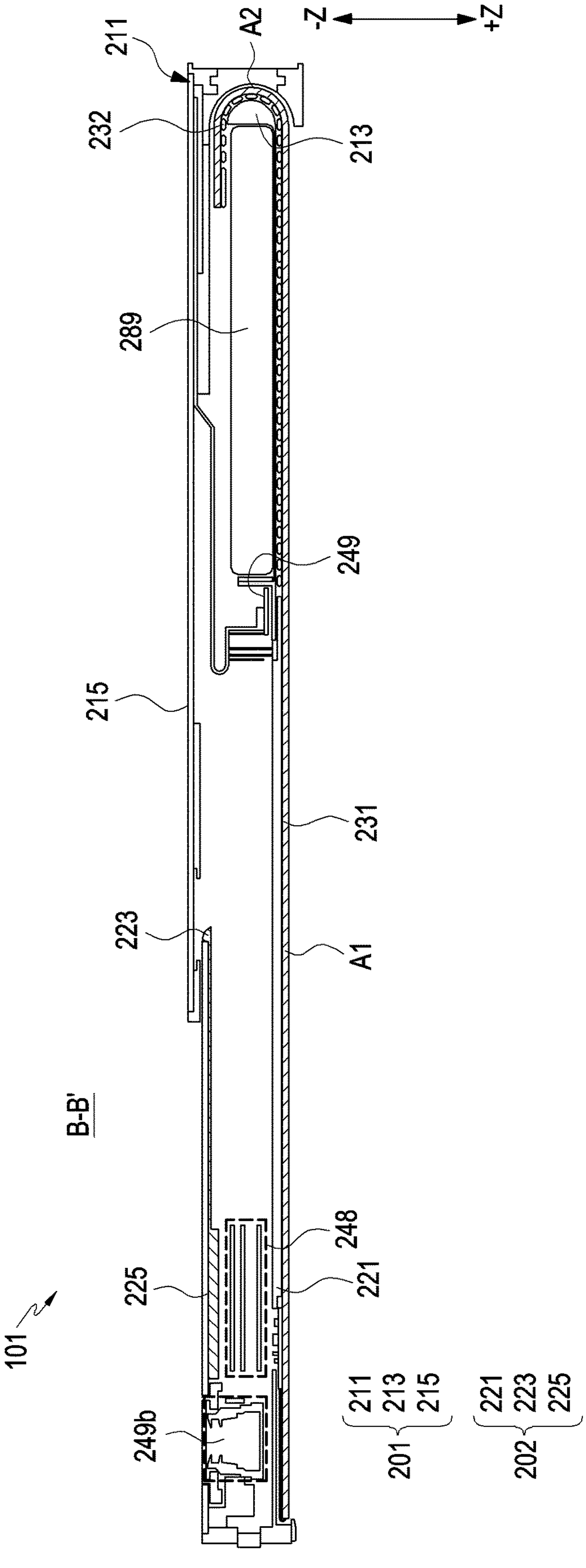
FIG. 5B is a cross-sectional view taken along line B-B' of FIG. 3 according to an embodiment of the disclosure.

According to an embodiment of the disclosure, the camera modules 249*a* and 249*b* may include a first camera module 249*a* (e.g., a front camera) and a second camera module 249*b* (e.g., a rear camera) (e.g., the second camera module 249*b* of FIGS. 5A and 5B). According to an embodiment of the disclosure, the electronic device 101 may include at least one of a wide-angle camera, a telephoto camera, or a close-up camera, and according to an embodiment of the disclosure, the electronic device 200 may measure the distance to the subject by including an infrared projector and/or an infrared receiver. The camera modules 249*a* and 249*b* may include one or more lenses, an image sensor, and/or an image signal processor. The first camera module 249*a* may be disposed to face in the same direction as the display 203. For example, the first camera module 249*a* may be disposed in an area around the first display area A1 or overlapping the display 203, and when disposed in the area overlapping the display 203, the first camera module 249*a* may capture the subject through the display 203. According to an embodiment of the disclosure, the first camera module 249*a* may include an under display camera (UDC) that has a screen display area (e.g., the first display area A1) that may not be visually exposed but hidden. According to an embodiment of the disclosure, the second camera module 249*b* may capture the subject in a direction opposite to the first display area A1. According to an embodiment of the disclosure, the first camera module 249*a* and/or the second camera module 249*b* may be disposed on the second housing 202.

According to an embodiment of the disclosure, an indicator (not shown) of the electronic device 101 may be disposed on the first housing 201 or the second housing 202, and the indicator may include a light emitting diode to provide state information about the electronic device 101 as a visual signal. The sensor module (not shown) of the electronic device 101 may produce an electrical signal or data value corresponding to the internal operation state or external environment state of the electronic device. The sensor module may include, for example, a proximity sensor, a fingerprint sensor, or a biometric sensor (e.g., an iris/face recognition sensor or a heartrate monitor (HRM) sensor). According to another embodiment of the disclosure, the sensor module may further include, e.g., at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

Figure 4:
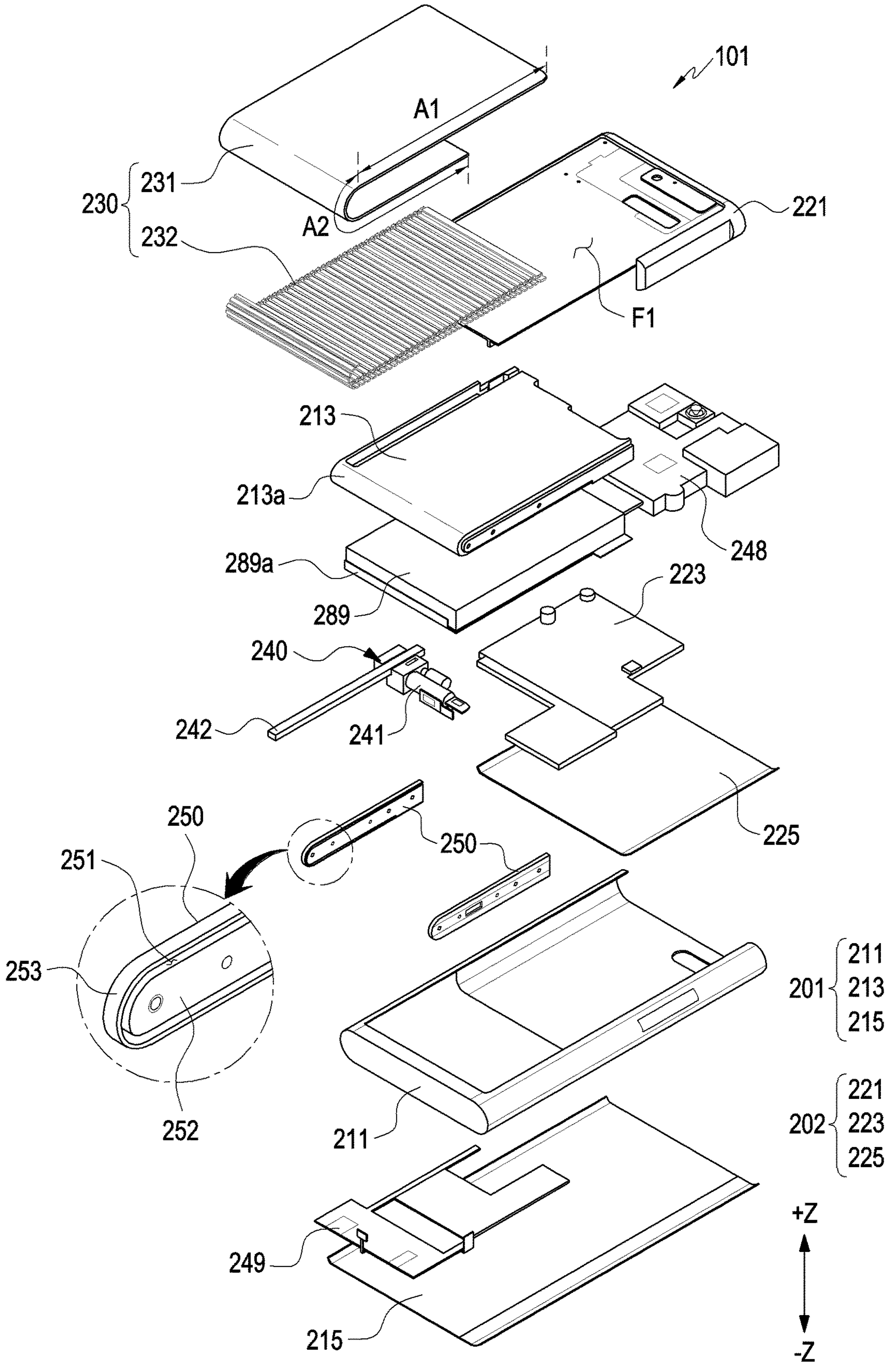
FIG. 4 is an exploded perspective view illustrating an electronic device according to an embodiment of the disclosure.

FIG. 4 is an exploded perspective view illustrating an electronic device according to an embodiment of the disclosure.

FIG. 5A is a cross-sectional view taken along line A-A' of FIG. 2 according to an embodiment of the disclosure.

FIG. 5B is a cross-sectional view taken along line B-B' of FIG. 3 according to an embodiment of the disclosure.

Referring to FIGS. 4, 5A, and/or 5B, an electronic device 101 may include a first housing 201, a second housing 202, a display assembly 230, and a driving structure 240. The configuration of the first housing 201, the second housing 202, and the display assembly 230 of FIGS. 4, 5A, and/or 5B may be identical in whole or part to the configuration of the first housing 201, the second housing 202, and the display 203 of FIGS. 2 and/or 3.

According to an embodiment of the disclosure, the first housing 201 may include a first cover member 211 (e.g., the first cover member 211 of FIGS. 2 and 3), a frame 213, and a first rear plate 215.

According to an embodiment of the disclosure, the first cover member 211 may receive at least a portion of the frame 213 and receive a component (e.g., battery 289) positioned in the frame 213. According to an embodiment of the disclosure, the first cover member 211 may be formed to surround at least a portion of the second housing 202. According to an embodiment of the disclosure, the second circuit board 249 receiving the electronic component (e.g., the processor 120 and/or the memory 130 of FIG. 1) may be connected to the first cover member 211.

According to an embodiment of the disclosure, the frame 213 may be connected to the first cover member 211. For example, the frame 213 may be connected to the first cover member 211, and the second housing 202 is movable relative to the first cover member 211 and/or the frame 213. According to an embodiment of the disclosure, the frame 213 may receive the battery 289. According to an embodiment of the disclosure, the frame 213 may include a curved portion 213*a* facing the display assembly 230.

According to an embodiment of the disclosure, the first rear plate 215 may substantially form at least a portion of the exterior of the first housing 201 or the electronic device 101. For example, the first rear plate 215 may be coupled to the outer surface of the first cover member 221. According to an embodiment of the disclosure, the first rear plate 215 may provide a decorative effect on the exterior of the electronic device 101. The first rear plate 215 may be formed of at least one of metal, glass, synthetic resin, or ceramic.

According to an embodiment of the disclosure, the second housing 202 may include a second cover member 221 (e.g., the second cover member 221 of FIGS. 2 and 3), a rear cover 223, and a second rear plate 225.

According to an embodiment of the disclosure, the second cover member 221 may be connected to the first housing 201 through a guide rail 250 and, while being guided by the guide rail 250, reciprocate linearly in one direction (e.g., the direction of arrow ① (in FIG. 3).

According to an embodiment of the disclosure, the second cover member 221 may support at least a portion of the display 203. For example, the second cover member 221 may include a first surface F1. The first display area A1 of the display 203 may be substantially positioned on the first surface F1 to maintain a flat panel shape. According to an embodiment of the disclosure, the second cover member 221 may be formed of a metal material and/or a non-metal (e.g., polymer) material. According to an embodiment of the disclosure, a first circuit board 248 receiving the electronic component (e.g., the processor 120 and/or the memory 130 of FIG. 1) may be connected to the second cover member 221.

According to an embodiment of the disclosure, the rear cover 223 may protect a component (e.g., the first circuit board 248) positioned on the second cover member 221. For example, the rear cover 223 may be connected to the second cover member 221 and may be formed to surround at least a portion of the first circuit board 248. According to an embodiment of the disclosure, the rear cover 223 may include an antenna pattern for communicating with an external electronic device. For example, the rear cover 223 may include a laser direct structuring (LDS) antenna.

According to an embodiment of the disclosure, the second rear plate 225 may substantially form at least a portion of the exterior of the second housing 202 or the electronic device 101. For example, the second rear plate 225 may be coupled to the outer surface of the second cover member 221. According to an embodiment of the disclosure, the second rear plate 225 may provide a decorative effect on the exterior of the electronic device 101. The second rear plate 215 may be formed of at least one of metal, glass, synthetic resin, or ceramic.

According to an embodiment of the disclosure, the display assembly 230 may include a display 231 (e.g., the display 203 of FIGS. 2 and/or 3) and a multi-bar structure 232 supporting the display 203. According to an embodiment of the disclosure, the display 231 may be referred to as a flexible display, a foldable display, and/or a rollable display.

According to an embodiment of the disclosure, the multi-bar structure 232 may be connected to or attached to at least a portion (e.g., the second display area A2) of the display 231. According to an embodiment of the disclosure, as the second housing 202 slides, the multi-bar structure 232 may move with respect to the first housing 201. In the closed state of the electronic device 101 (e.g., FIG. 2), the multi-bar structure 232 may be mostly received in the first housing 201 and may be positioned between the first cover member 211 and the second cover member 221. According to an embodiment of the disclosure, at least a portion of the multi-bar structure 232 may move corresponding to the curved surface 213*a* positioned at the edge of the frame 213. According to an embodiment of the disclosure, the multi-bar structure 232 may be referred to as a display supporting member or supporting structure and may be in the form of one elastic plate.

According to an embodiment of the disclosure, the driving structure 240 may move the second housing 202 relative to the first housing 201. For example, the drive structure 240 may include a motor 241 configured to generate a driving force for sliding the first housing 201 and the second housing 202. The driving structure 240 may include a gear (e.g., a pinion) connected to the motor 241 and a rack 242 configured to mesh with the gear.

According to an embodiment of the disclosure, the housing in which the rack 242 is positioned and the housing in which the motor 241 is positioned may be different. According to an embodiment of the disclosure, the motor 241 may be connected to the second housing 202, and the rack 242 may be connected to the first housing 201. According to another embodiment of the disclosure, the motor 241 may be connected to the first housing 201, and the rack 242 may be connected to the second housing 202.

According to an embodiment of the disclosure, the first housing 201 may receive the first circuit board 248 (e.g., a main board). According to an embodiment of the disclosure, the processor, memory, and/or interface may be mounted on the first circuit board 248. The processor may include one or more of, e.g., a central processing unit, an application processor, a graphic processing device, an image signal processing, a sensor hub processor, or a communication processor. According to an embodiment of the disclosure, the first circuit board 248 may include a flexible printed circuit board type radio frequency cable (FRC). The first circuit board 248 may be disposed on at least a portion of the second cover member 221 and may be electrically connected to the antenna module and the communication module.

According to an embodiment of the disclosure, the memory may include, e.g., a volatile or non-volatile memory.

According to an embodiment of the disclosure, the interface may include, e.g., a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multimedia card (MMC) connector, or an audio connector.

According to an embodiment of the disclosure, the electronic device 101 may include a second circuit board 249 (e.g., a sub circuit board) spaced apart from the first circuit board 248 (e.g., a main circuit board) in the first housing 201. The second circuit board 249 may be electrically connected to the first circuit board 248 through a connection flexible board. The second circuit board 249 may be electrically connected with electric components disposed in an end area of the electronic device 101, such as the battery 289 or a speaker and/or a sim socket, and may transfer signals and power. According to an embodiment of the disclosure, the second circuit board 249 may receive a wireless charging antenna (e.g., coil). For example, the battery 289 may receive power from an external electronic device through the wireless charging antenna. As another example, the battery 289 may transfer power to the external electronic device by the wireless charging antenna.

According to an embodiment of the disclosure, the battery 289 may be a device for supplying power to at least one component of the electronic device 101, and may include a primary cell which is not rechargeable, a secondary cell which is rechargeable, or a fuel cell. The battery 289 may be integrally or detachably disposed inside the electronic device 101. According to an embodiment of the disclosure, the battery 289 may be formed of a single embedded battery or may include a plurality of removable batteries. According to an embodiment of the disclosure, the battery 289 may be positioned in a frame 213, and the battery 289 may be slid along with the frame 213.

According to an embodiment of the disclosure, the guide rail 250 may guide the movement of the multi-bar structure 232. For example, the multi-bar structure 232 may slide along a slit 251 formed in the guide rail 250. According to an embodiment of the disclosure, the guide rail 250 may be connected to the first housing 201. For example, the guide rail 250 may be connected to the first cover member 211 and/or the frame 213. According to an embodiment of the disclosure, the slit 251 may be referred to as a groove or recess formed in the inner surface of the guide rail 250.

According to an embodiment of the disclosure, the guide rail 250 may provide pressure to the multi-bar structure 233 based on the driving of the motor 241.

According to an embodiment of the disclosure, when the electronic device 101 changes from the closed state to opened state, an inner portion 252 of the guide rail 250 may provide pressure to the multi-bar structure 232. The multi-bar structure 232 receiving the pressure may be moved along the slit 251 of the guide rail 250, and the second housing 202 may be changed from the slide-in state to slide-out state with respect to the first housing 201. At least a portion of the display assembly 230 accommodated between the first cover member 211 and the frame 213 may be extended to the front surface.

According to an embodiment of the disclosure, when the electronic device 101 changes from the opened state to closed state, an outer portion 253 of the guide rail 250 may provide pressure to the bent multi-bar structure 232. The multi-bar structure 232 receiving the pressure may be moved along the slit 251 of the guide rail 250, and the second housing 202 may be changed from the slide-out state to slide-in state with respect to the first housing 201. At least a portion of the display assembly 230 may be accommodated between the first cover member 211 and the frame 213.

Referring to FIG. 5A, in the closed state of the electronic device 101, at least a portion of the second housing 202 may be disposed to be received in the first housing 201. As the second housing 202 is disposed to be received in the first housing 201, the overall volume of the electronic device 101 may be reduced. According to an embodiment of the disclosure, when the second housing 202 is received in the first housing 201, the size of the visually exposed display 231 may be minimized. For example, if the second housing 202 is completely received in the first housing 201, the first display area A1 of the display 231 may be visually exposed, and the second display area A2 may not be visually exposed. At least a portion of the second display area A2 may be disposed between the battery 289 and the rear plate 215 and 225.

Referring to FIG. 5B, in the opened state of the electronic device 101, at least a portion of the second housing 202 may protrude from the first housing 201. As the second housing 202 is disposed to protrude from the first housing 201, the overall volume of the electronic device 101 may be increased. According to an embodiment of the disclosure, if the second housing 202 protrudes from the first housing 201, at least a portion of the second display area A2 of the display 231, together with the first display area A1, may be visually exposed to the outside of the electronic device 101.

Figure 6:
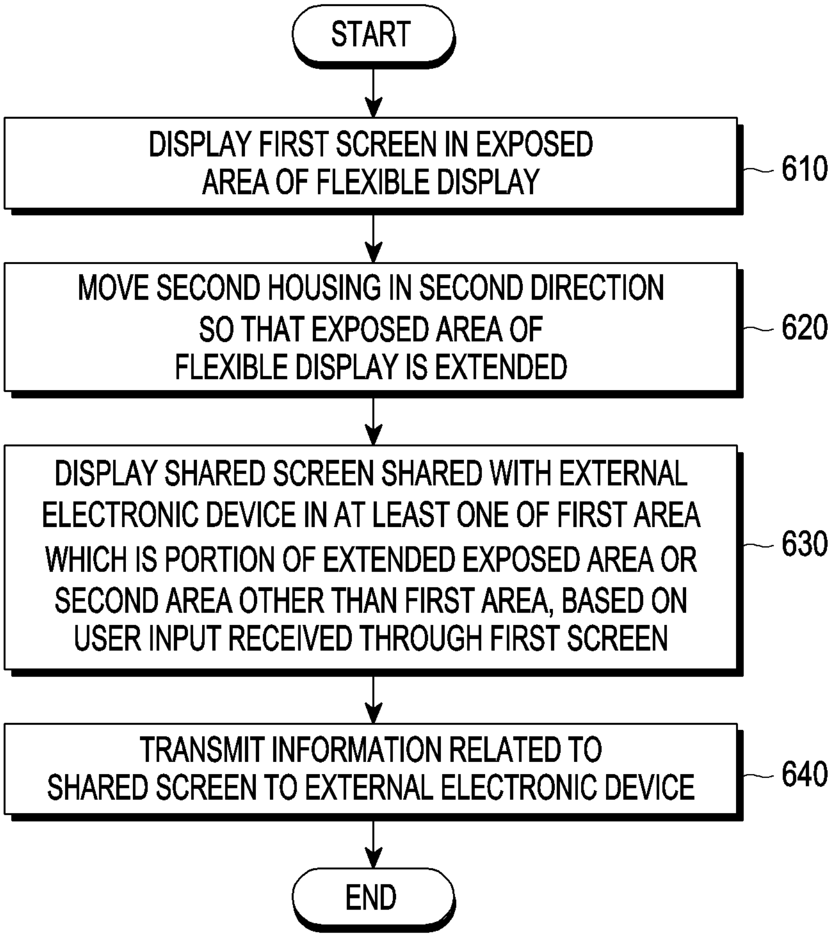
FIG. 6 is a flowchart illustrating an operation of displaying a shared screen and a non-shared screen in an open state of an electronic device according to an embodiment of the disclosure.

FIG. 6 is a flowchart illustrating an operation of displaying a shared screen and a non-shared screen in an open state of an electronic device according to an embodiment of the disclosure.

Referring to FIG. 6, in operation 610, an electronic device (e.g., the electronic device 101 of FIG. 1, the electronic device 101 of FIG. 2, or the processor 120 of FIG. 1) may display a first screen in an exposed area of a flexible display (e.g., the display module 160 of FIG. 1). According to an embodiment of the disclosure, the flexible display may be referred to as a rollable display. According to an embodiment of the disclosure, the electronic device may display the first screen in the exposed area of the flexible display in a closed state. For example, the first screen may be an application execution screen executed by a user input.

According to an embodiment of the disclosure, the first screen display operation in the closed state is described below with reference to FIG. 9A.

In the mirroring method of the related art, when content is mirrored from a mobile terminal to a device, such as a television (TV) or a monitor, the content of the mobile terminal is reflected as it is so that the content of the mobile terminal is exposed to the device currently being mirrored. Further, it is impossible to do other things (chatting, Internet search, or the like) without switching the screen while sharing.

Further, in a multitasking context in which the electronic device shares a virtual display screen on which a specific application is executed with an external electronic device, and the electronic device displays only a built-in display screen, it is impossible to control the virtual display screen because the virtual display screen is transferred unlike the mirroring of the related art in which the built-in display screen is transferred as it is. Therefore, in order to control the application of the virtual display screen, it is necessary to switch the corresponding application to the built-in display and then to the virtual display screen after controlling the application. In this process, usability is deteriorated, and further, during switching between the built-in display screen and the virtual display screen, screen aspect ratio adjustment may be impossible or media being played back may be paused depending on the context of the application.

Hereinafter, according to a rollable device capable of extending the flexible display, the flexible display area may be divided into a main display area and a sub display area, and may be allowed to be selectively shared between the main display area and the sub display area, thereby increasing usability compared to the rollable device of the related art. As described above, an electronic device for sharing a screen with an external electronic device while maintaining usability as a method for controlling the same are provided.

According to an embodiment of the disclosure, in operation 620, the electronic device may move the second housing (e.g., the second housing 202 of FIG. 2) in a second direction so that the exposed area of the flexible display is extended.

According to an embodiment of the disclosure, when a user input for extending the exposed area of the flexible display is received, the electronic device may move the second housing in the second direction. According to an embodiment of the disclosure, the electronic device may receive a user input for extending the exposed area of the flexible display through a physical key or a soft key provided in the electronic device.

According to an embodiment of the disclosure, the electronic device may receive a user input for moving the second housing. For example, the electronic device may control linear motion of the first housing of the electronic device based on the user's input event (e.g., a button touch) while executing at least one application. The electronic device may control the sliding movement of the first housing of the electronic device based on the user's input event. In the disclosure, an example in which the extending direction of the rollable display follows the vertical axis of the electronic device has been mainly described, but the disclosure is not limited thereto.

According to an embodiment of the disclosure, a V-rollable display may extend along the y-axis of the electronic device. The motor may perform rotation based on the X-axis, and the first housing may be linearly moved along the y-axis.

According to an embodiment of the disclosure, the electronic device may perform a slide-in operation or a slide-out operation based on the detected event.

According to an embodiment of the disclosure, the user input event may include at least one of a button, a touch, a gesture, a voice, an external input (e.g., hover, air gesture, air pointer) of an electronic pen, wireless communication (e.g., Bluetooth (BT) button), or the like.

According to an embodiment of the disclosure, the electronic device may perform a slide-in operation or a slide-out operation based on a user input event of pressing the power button.

According to an embodiment of the disclosure, the electronic device may perform a slide-in operation or a slide-out operation based on a context (e.g., the time and the place where the user input event is detected, the application being executed, or content being displayed).

According to an embodiment of the disclosure, the electronic device may include a driving module for moving the second housing with respect to the first housing.

According to an embodiment of the disclosure, the driving module may include a motor, a motor gear unit, and a gear unit.

According to an embodiment of the disclosure, the motor and the motor gear unit may be disposed in the second housing. In an embodiment of the disclosure, the motor gear unit may be engaged with the gear unit and may transfer driving of the motor to the gear unit. According to an embodiment of the disclosure, the motor may rotate the motor gear unit based on a signal received from a processor (e.g., the processor 120 of FIG. 1).

According to an embodiment of the disclosure, the gear unit may include a rack gear unit. For example, the gear unit may be disposed on the rear surface of the first plate included in the first housing 201 and slide the first plate of the first housing 201 by linearly moving according to the driving of the motor. For example, the gear unit may convert the rotational motion of the motor into linear motion. The gear unit may move the first plate in a linear direction.

According to an embodiment of the disclosure, the electronic device may track the moving direction and the moving distance of the second housing with respect to the first housing. According to an embodiment of the disclosure, the electronic device may obtain moving distance information about the housing using sensor information based on an external factor event (magnetic force, magnetization). For example, the electronic device may obtain the moving distance of the second housing with respect to the first housing by a phase difference of (e.g., four) hall ICs disposed in the first housing and/or the second housing. According to an embodiment of the disclosure, the electronic device may calculate the moving distance using a four-hall IC raw data combination algorithm.

According to an embodiment of the disclosure, in operation 630, based on a user input received through the first screen, the electronic device may display a shared screen shared with the external electronic device in at least one of a first area, which is a portion of the extended exposed area, or a second area different from the first area.

According to an embodiment of the disclosure, when the exposed area of the display of the electronic device is extended, the electronic device may display a screen to be shared with the external electronic device in one of the first area, which is an exposed area in the closed state in the extended exposed area, and the second area, which is an extended area other than the first area. According to an embodiment of the disclosure, the area in which the shared screen is to be displayed may be set by the user or the manufacturer.

According to an embodiment of the disclosure, the electronic device may display a non-shared screen in the first area and may display a shared screen in the second area.

According to an embodiment of the disclosure, the electronic device may display a shared screen in the first area and may display a non-shared screen in the second area.

According to an embodiment of the disclosure, the electronic device may display a first shared screen in the first area and may display a second shared screen in the second area.

According to an embodiment of the disclosure, in operation 640, the electronic device may transmit information related to the shared screen to the external electronic device.

According to an embodiment of the disclosure, the information related to the shared screen may include pixel information for mirroring the shared screen and size information about the shared screen. For example, the size information about the shared screen may include at least one of the horizontal length, the vertical length, or the ratio between the horizontal length and the vertical length of the shared screen.

According to an embodiment of the disclosure, the electronic device may transmit, to the external electronic device, information including size information about the shared screen for extending the flexible display of the external electronic device based on the size of the shared screen. For example, the electronic device may transmit only the size information about the shared screen of the electronic device to the external electronic device, or may transmit an extension command of the external electronic device based on the size information about the shared screen.

According to an embodiment of the disclosure, if a set input is received, the electronic device may switch the screen displayed in the first area and the screen displayed in the second area. For example, when a swipe input from the first area to the second area or a swipe input from the second area to the first area is received, the electronic device may switch the screen displayed in the first area and the bottom surface displayed in the second area. As described above, the electronic device according to an embodiment of the disclosure may overcome limitations and inconveniences of mirroring technology in the device of the related art and increase mirroring usability in a rollable device compared to the device of the related art.

Figure 7A:
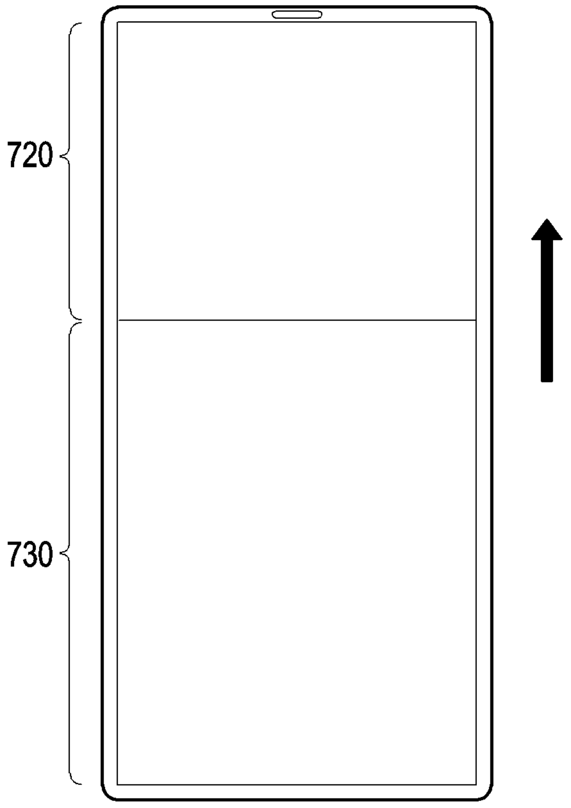
FIG. 7A is a view illustrating an arrangement of a plurality of display areas when an electronic device has a vertically extended form according to an embodiment of the disclosure.

FIG. 7A is a view illustrating an arrangement of a plurality of display areas when an electronic device has a vertically extended form according to an embodiment of the disclosure.

Figure 7B:
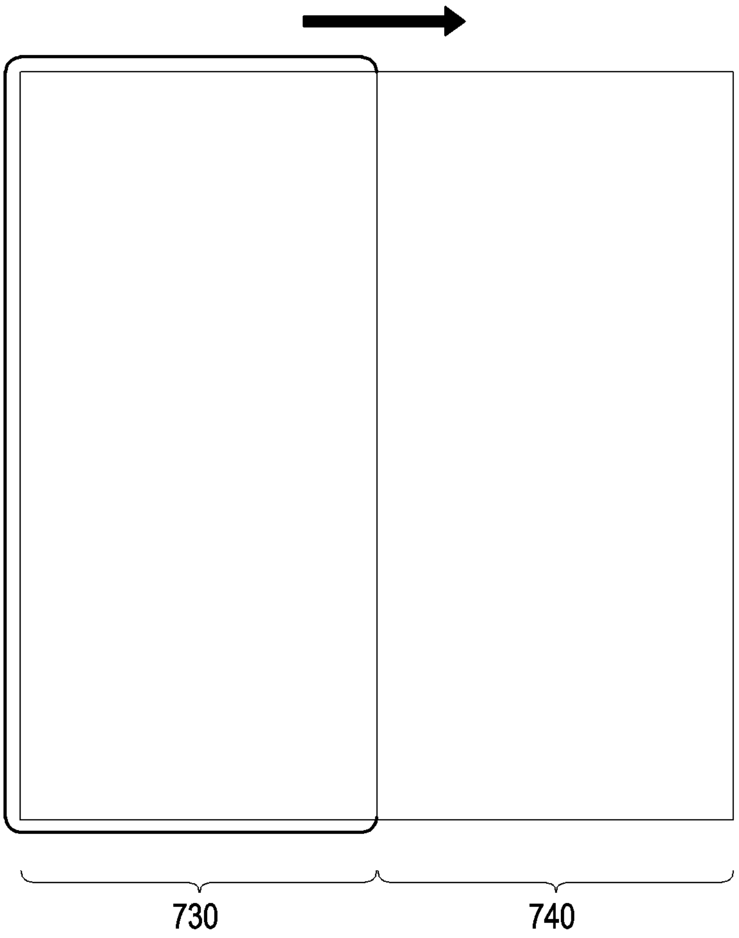
FIG. 7B is a view illustrating an arrangement of a plurality of display areas when an electronic device has a horizontally extended form according to an embodiment of the disclosure.

FIG. 7B is a view illustrating an arrangement of a plurality of display areas when an electronic device has a horizontally extended form according to an embodiment of the disclosure.

According to an embodiment of the disclosure, a flexible display device (e.g., a rollable device) (e.g., the electronic device 101 of FIG. 1 or the electronic device 101 of FIG. 2) having a variable size may be configured so that the length of one display (e.g., the display module 160 of FIG. 1) may be variably changed physically, and accordingly, one logical display (e.g., the display area) may be variably changed. This provides the same structure as the mobile device of the related art except for the difference in that the used area of the application is variably changed as the logical display is variably changed. According to an embodiment of the disclosure, the logical display may be defined as a software screen shown to the user based on the configuration (information) of the currently activated display, as a component of the framework end generated by the display manager (e.g., the processor 120 of FIG. 1) controlling the display area.

For example, when it is necessary to use two or more displays (two or more areas) while using one display, the electronic device may support a multi-window function. However, since the mirroring technology of the related art transmits based on the display area of the terminal, the multi-window of the related art is displayed on a synchronized device as it is and, as there is no distinction of the display area, use of the device (source) separately from mirroring may be impossible.

According to an embodiment of the disclosure, referring to FIGS. 7A and 7B, an electronic device (e.g., a rollable device) according to the disclosure may be configured with two logical display areas, rather than one logical display of the related art, in the mirroring-connected state. These two display areas share memory but may be processed as separate display areas.

Referring to FIG. 7A, when the electronic device performs a sliding operation in a direction parallel to the direction (e.g., the vertical direction) of the longer of the horizontal length and the vertical length of the electronic device, the electronic device may identify an exposed area in the closed state of the electronic device as a first area 710, and may identify an area other than the first area 710 in the exposed area in the extended state of the electronic device as a second area 720. For example, the first area 710 may be disposed above the second area 720.

Referring to FIG. 7B, when the electronic device performs a sliding operation in a direction parallel to the direction (e.g., the horizontal direction) of the shorter of the horizontal length and the vertical length of the electronic device, the electronic device may identify an exposed area in the closed state of the electronic device as the first area 730, and may identify an area other than the first area 730 in the exposed area in the extended state of the electronic device as a second area 740. For example, the first area 730 may be disposed on the left or right side of the second area 740.

According to an embodiment of the disclosure, the electronic device may generate a new logical display area in the second areas 720 and 740 exposed by the display extension to display a non-shared screen that may be controlled separately from the shared screen (e.g., the mirroring screen) shared with the external electronic device.

According to an embodiment of the disclosure, it is possible to share the screen of the electronic device by transcoding the display screen of the electronic device (e.g., a source device) capable of supporting Miracast and transmitting the same to the external electronic device (e.g., a sink device).

According to an embodiment of the disclosure, the shared screen (e.g., mirroring screen) may be a built-in display screen or a virtual display screen. According to an embodiment of the disclosure, the virtual display screen is a screen shared with the external electronic device, but is not shared as it is, on the external electronic device and the screen displayed on the electronic device like the built-in display screen, but the performed function and the displayed content are shared with the external electronic device, but the screen format (e.g., layout) may be varied depending on the type (e.g., tablet, personal computer (PC), or TV) of the external electronic device, or the operating system. According to an embodiment of the disclosure, the screen transmitted to the external electronic device may be switched between the built-in display screen and the virtual display screen.

According to an embodiment of the disclosure, the electronic device may move the second housing in the second direction so that the exposed area of the flexible display is extended. For example, referring to FIG. 7A, the electronic device may move the second housing upward. According to an embodiment of the disclosure, referring to FIG. 7B, the electronic device may move the second housing in a right direction.

According to an embodiment of the disclosure, the electronic device may display the shared screen shared with the external electronic device in at least one of the first area 710 or 730, which is a portion of the extended exposed area, or the second area 720 or 740 different from the first area 710 or 730.

According to an embodiment of the disclosure, the first area 710 or 730 may correspond to an exposed area in the shrunken state of the exposed area of the flexible display.

According to an embodiment of the disclosure, the second area 720 or 740 may be an area other than the first area 710 or 730 of the exposed area in the enlarged state of the exposed area of the flexible display. According to an embodiment of the disclosure, when the exposed area of the flexible display is changed from the shrunken state to the enlarged state, the second area 720 or 740 may mean only the additionally extended area.

According to an embodiment of the disclosure, the electronic device may transmit information related to the shared screen to an external electronic device (e.g., the external electronic device 102 of FIG. 1) through a communication module (e.g., the communication module 190 of FIG. 1).

According to an embodiment of the disclosure, the information related to the shared screen may include information for mirroring the screen displayed in the exposed area of the flexible display of the electronic device. According to an embodiment of the disclosure, the information related to the shared screen may further include size information about the shared screen for extending the flexible display of the external electronic device based on the size of the shared screen. According to an embodiment of the disclosure, the electronic device may transmit, to the external electronic device, a control command for controlling the flexible display of the external electronic device to be extended based on the size of the shared screen.

Figure 8A:
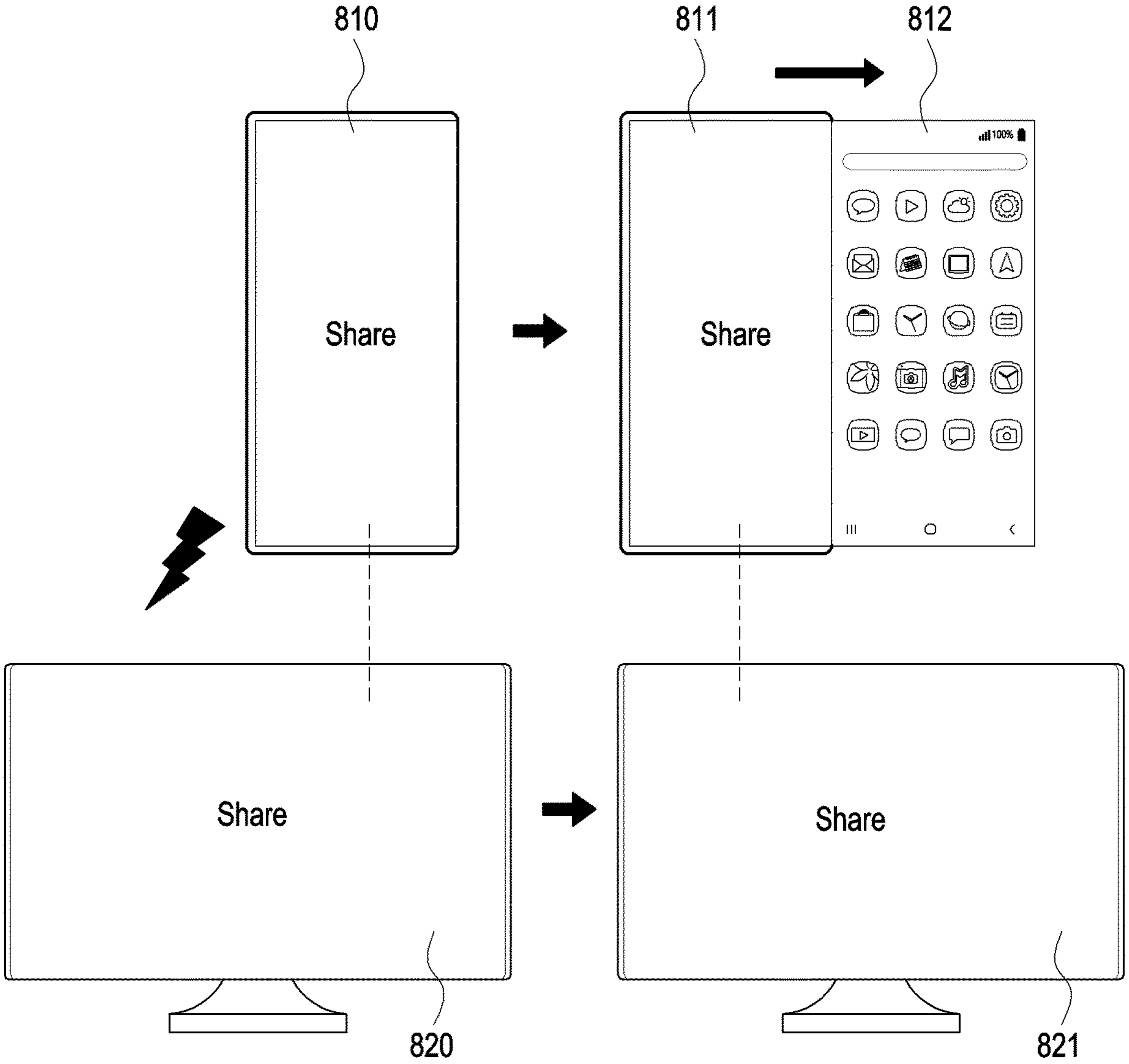
FIG. 8A is a view illustrating an operation of displaying a shared screen and a non-shared screen in an open state of an electronic device according to an embodiment of the disclosure.

FIG. 8A is a view illustrating an operation of displaying a shared screen and a non-shared screen in an open state of an electronic device according to an embodiment of the disclosure.

Referring to FIG. 8A, an electronic device (e.g., the electronic device 101 of FIG. 1, the electronic device 101 of FIG. 2 or the processor 120 of FIG. 1) may display a shared screen 810 in an exposed area of a flexible display (e.g., the display module 160 of FIG. 1) in a closed state of the electronic device.

According to an embodiment of the disclosure, a shared screen 820 corresponding to the shared screen of the electronic device may be displayed on a display of an external electronic device (e.g., the external electronic device 102 of FIG. 1) communicating with the electronic device. According to an embodiment of the disclosure, the shared screen 810 displayed on the electronic device and the shared screen 820 displayed on the external electronic device may be the same, or have different screen sizes.

According to an embodiment of the disclosure, when the exposed area of the flexible display is extended, the electronic device may display a shared screen 811 in the first area and may display a non-shared screen 812 in the second area. For example, if the electronic device is extended in a state in which the screen 810 displayed in the first area, which is the exposed area in the shrunken state, is shared with the external electronic device, the electronic device may generate a new logical display area in the second area added other than the first area to perform another function of the electronic device.

According to an embodiment of the disclosure, referring to FIG. 8A, when the electronic device is extended while mirroring the screen of the electronic device (e.g., a mobile terminal (source)) to the external electronic device (e.g., a TV (sink)), the new logical display area may be generated in the extended area (e.g., the second area) rather than the existing shared area (e.g., the first area) being extended, thereby enabling execution of another application. For example, the electronic device may display the home screen of the electronic device in the second area. According to an embodiment of the disclosure, the external electronic device may display a shared screen 821 corresponding to the screen 811 displayed in the first area, rather than the screen 812 displayed in the second area of the electronic device.

Accordingly, the electronic device according to the disclosure may configure a new display area in the new area which is extended while maintaining mirroring between the electronic device and the external electronic device, and use the same as an additional display.

Figure 8B:
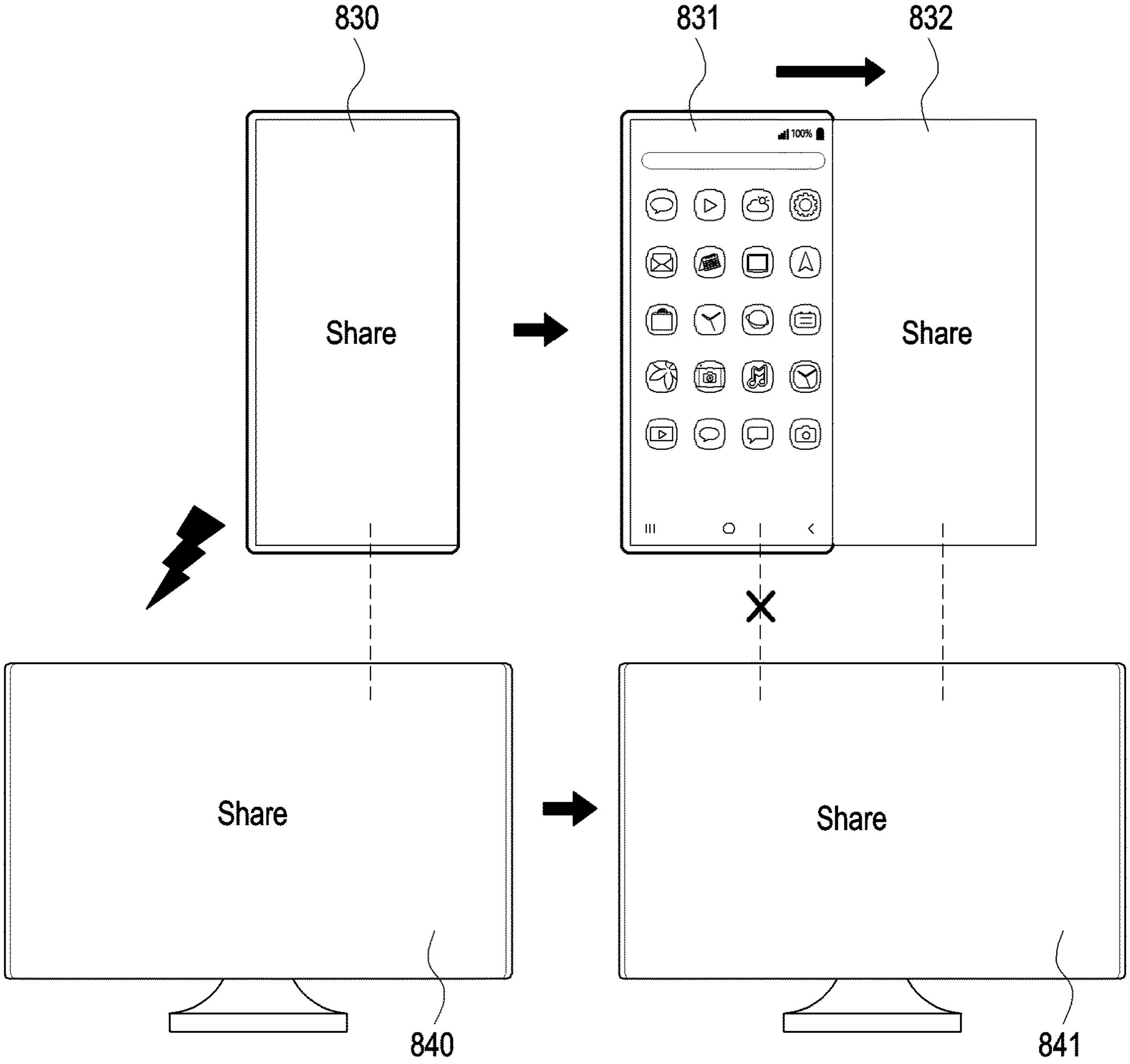
FIG. 8B is a view illustrating an operation of displaying a shared screen and a non-shared screen in an open state of an electronic device according to an embodiment of the disclosure.

FIG. 8B is a view illustrating an operation of displaying a shared screen and a non-shared screen in an open state of an electronic device according to an embodiment of the disclosure.

Referring to FIG. 8B, an electronic device (e.g., the electronic device 101 of FIG. 1, the electronic device 101 of FIG. 2 or the processor 120 of FIG. 1) may display a shared screen 830 in an exposed area of a flexible display (e.g., the display module 160 of FIG. 1) in a closed state of the electronic device.

According to an embodiment of the disclosure, a shared screen 840 corresponding to the shared screen of the electronic device may be displayed on a display of an external electronic device (e.g., the external electronic device 102 of FIG. 1) communicating with the electronic device. According to an embodiment of the disclosure, the shared screen 830 displayed on the electronic device and the shared screen 840 displayed on the external electronic device may be the same, or have different screen sizes.

If the exposed area of the flexible display is extended, the electronic device may display a non-shared screen 831 in the first area and may display a shared screen 832 in the second area. For example, if the electronic device is extended in a state in which the screen 830 displayed in the first area, which is the exposed area in the shrunken state, is shared with the external electronic device, the electronic device may generate a new logical display area in the second area added other than the first area to perform another function of the electronic device.

According to an embodiment of the disclosure, referring to FIG. 8B, when the electronic device is extended while mirroring the screen of the electronic device (e.g., a mobile terminal (source)) to the external electronic device (e.g., a TV (sink)), the new logical display area may be generated in the extended area (e.g., the second area) rather than the existing shared area (e.g., the first area) being extended, thereby displaying the existing shared screen in the extended area and enabling execution of another application. For example, the electronic device may display the home screen of the electronic device in the first area. According to an embodiment of the disclosure, the external electronic device may display a shared screen 841 corresponding to the screen 832 displayed in the second area rather than the screen 831 displayed in the first area of the electronic device.

Accordingly, the electronic device according to the disclosure may display the shared screen in the extended existing area while maintaining mirroring between the electronic device and the external electronic device in the extended new area, and use the same as an additional display.

According to an embodiment of the disclosure, for the sound when two display areas of the electronic device are created, a user interface (UI) may be provided so that the sound may be heard selectively between the two displays, or the sound of the focused display area may be preferentially heard. According to an embodiment of the disclosure, the electronic device may not output the sound of the corresponding display area selectively.

According to an embodiment of the disclosure, if a set input is received, the electronic device may switch the screen displayed in the first area and the screen displayed in the second area. For example, when an operation of touching the first area and swiping in the direction in which the second area is positioned or an operation of touching the second area and swiping in the direction in which the first area is positioned is received, the electronic device may switch the position of the screen displayed in the first area and the position of the screen displayed in the second area.

Figure 9A:
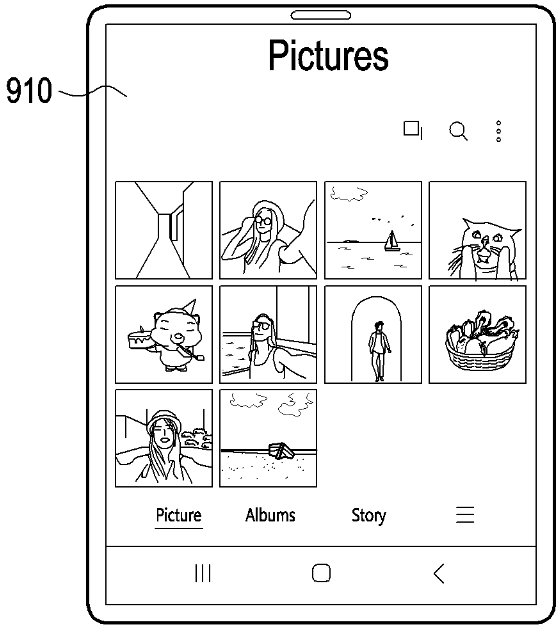
FIG. 9A is a view illustrating an operation of an electronic device in a closed state according to an embodiment of the disclosure.

FIG. 9A is a view illustrating an operation of an electronic device in a closed state according to an embodiment of the disclosure.

Referring to FIG. 9A, an electronic device (e.g., the electronic device 101 of FIG. 1, the electronic device 101 of FIG. 2, or the processor 120 of FIG. 1) may display an application execution screen 910 in a closed state. According to an embodiment of the disclosure, the application execution screen 910 may be a non-shared screen that is not shared with the external electronic device.

Figure 9B:
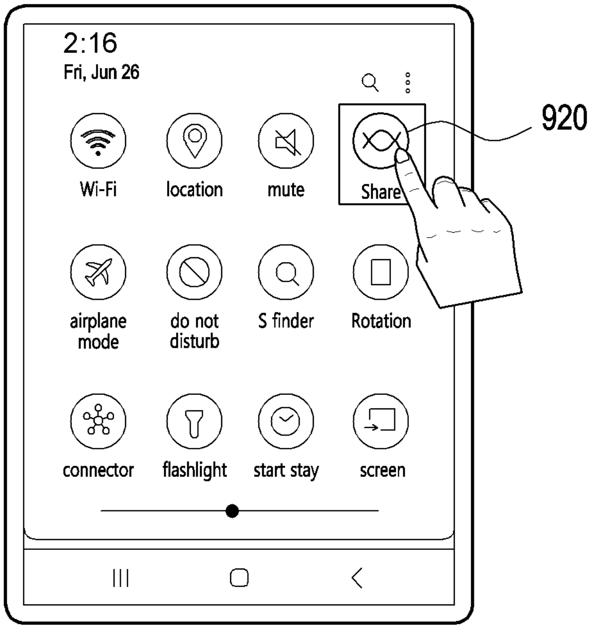
FIG. 9B is a view illustrating a user input for changing an electronic device into an open state in the state shown in FIG. 9A according to an embodiment of the disclosure.

FIG. 9B is a view illustrating a user input for changing an electronic device into an open state in the state shown in FIG. 9A according to an embodiment of the disclosure.

Referring to FIG. 9B, the electronic device may receive a user input 920 for changing the electronic device in the closed state to the open state. For example, the electronic device may receive a user input for selecting a soft key or a physical key to change the electronic device to the open state.

Figure 9C:
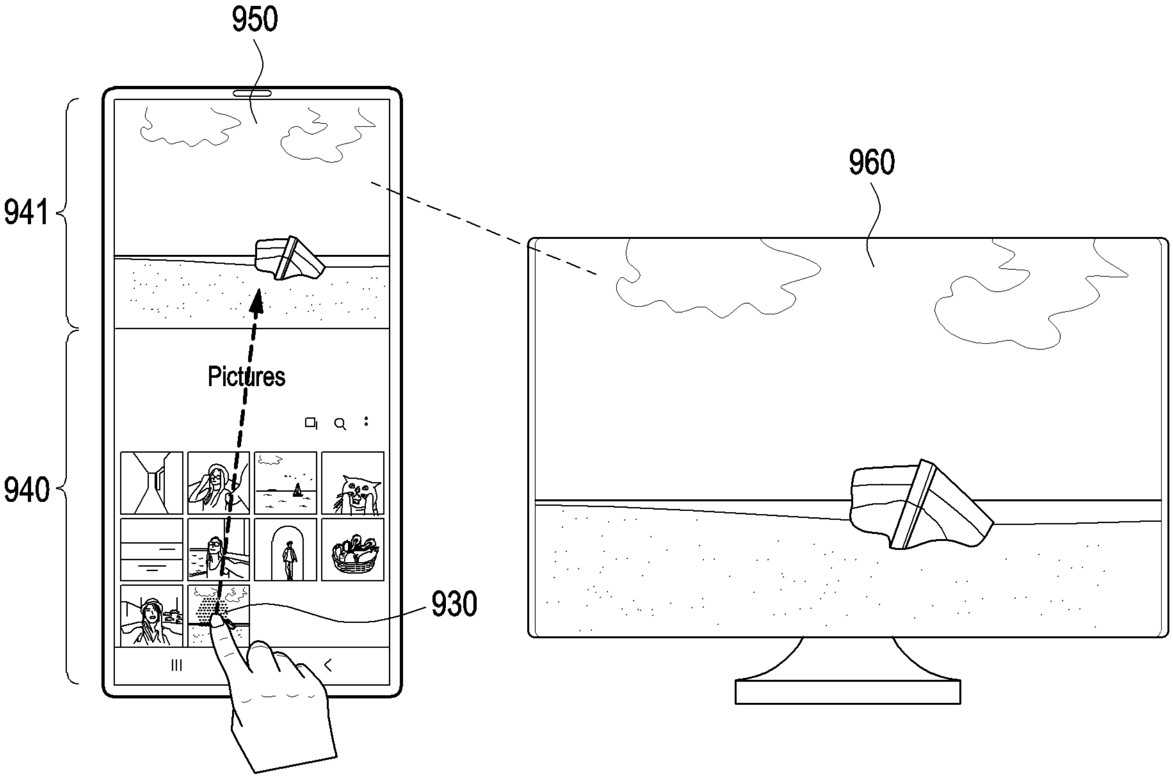
FIG. 9C is a view illustrating an operation of sharing a screen with an external electronic device in an open state of an electronic device according to an embodiment of the disclosure.

FIG. 9C is a view illustrating an operation of sharing a screen 950 with an external electronic device in an open state of an electronic device according to an embodiment of the disclosure.

Referring to FIG. 9C, if the exposed area of the flexible display is extended, the electronic device may display a non-shared screen in a first area 940 and may display a shared screen in a second area 941. For example, when an input for extending the flexible display is received in the shrunken state of the electronic device, and an input 930 for selecting content to be shared on the screen displayed in the first area before, while, or after the flexible display is extended is received, the selected shared content screen may be displayed in the second area 941. According to an embodiment of the disclosure, the electronic device may generate a new logical display area in the second area 941 to share the screen displayed in the second area 941 with the external electronic device, and may perform another function through the screen displayed in the first area 940 regardless of sharing. According to an embodiment of the disclosure, the external electronic device may display a screen 960 corresponding to the screen displayed in the first area 941 of the electronic device.

According to an embodiment of the disclosure, referring to FIG. 9C, the electronic device may be extended while being used and perform mirroring only on the extended area. According to an embodiment of the disclosure, the electronic device may generate a new logical display area in the extended area to configure a new display area, and may drag and share content to be mirrored in the area, or may execute and display a specific application. According to an embodiment of the disclosure, the electronic device may use the extended area (e.g., the second area) and the non-extended area (e.g., the first area) separately.

According to an embodiment of the disclosure, the external electronic device (e.g., TV) may receive information related to the shared screen from the electronic device and display a screen corresponding to the shared screen. For example, when the shared screen displayed on the electronic device is a built-in display screen, the external electronic device may display the same screen, and when the shared screen displayed on the electronic device is a virtual display screen, the external electronic device may display a different screen depending on the type (e.g., tablet, PC, TV) of the external electronic device or the operating system, while the performed function and the displayed content are shared with the electronic device.

According to an embodiment of the disclosure, if a set input is received, the electronic device may switch the screen displayed in the first area 940 and the screen displayed in the second area 941. For example, when an operation of touching the first area 940 and swiping in the direction in which the second area 941 is positioned or an operation of touching the second area 940 and swiping in the direction in which the first area 941 is positioned is received, the electronic device may switch the position of the screen displayed in the first area and the position of the screen displayed in the second area.

Figure 10A:
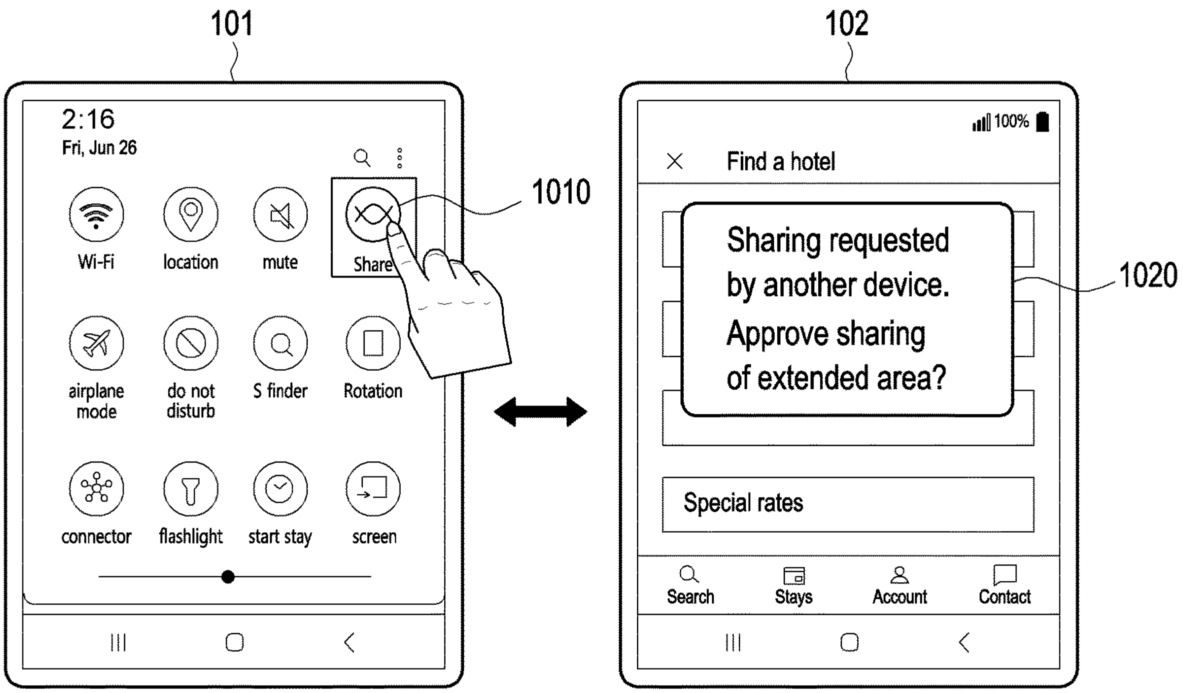
FIG. 10A is a view illustrating an operation of identifying screen sharing approval of an external electronic device when a request for screen sharing is transmitted from an electronic device according to an embodiment of the disclosure.

FIG. 10A is a view illustrating an operation of identifying screen sharing approval of an external electronic device when a request for screen sharing is transmitted from an electronic device according to an embodiment of the disclosure.

Figure 10B:
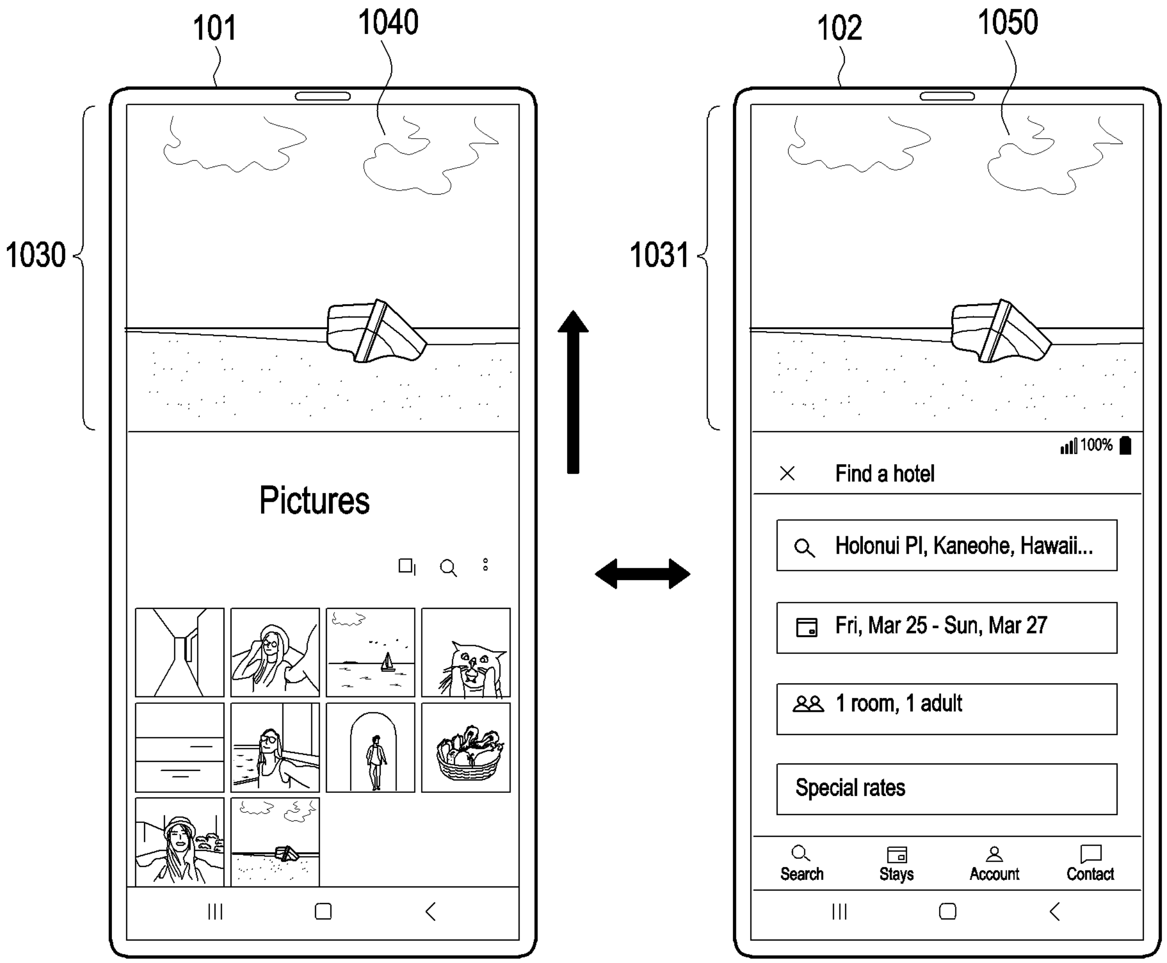
FIG. 10B is a view illustrating a screen sharing operation of an electronic device and an external electronic device when screen sharing is approved through the operation shown in FIG. 10A according to an embodiment of the disclosure.

FIG. 10B is a view illustrating a screen sharing operation of an electronic device and an external electronic device when screen sharing is approved through the operation shown in FIG. 10A according to an embodiment of the disclosure.

According to an embodiment of the disclosure, when the external electronic device is a rollable device, if the exposed area of the flexible display is extended, the electronic device may display the non-shared screen in the first area and display the shared screen in the second area, and the external electronic device may extend the exposed area of the flexible display and display the shared screen in the extended area corresponding to the second area of the flexible display of the electronic device.

Referring to FIG. 10A, if an input 1010 for extending the flexible display (e.g., the display module 160 of FIG. 1) is received in the shrunken state of the electronic device 101 (e.g., the electronic device 101 of FIG. 1 or the electronic device 101 of FIG. 2), the electronic device may transmit a request for screen sharing to the external electronic device 102 (e.g., the external electronic device 102 of FIG. 1), and the external electronic device 102 may display a UI 1020 for receiving confirmation from the user as to whether to share the screen, based on receiving the request. According to an embodiment of the disclosure, when an input for screen sharing approval is received through the UI 1020 displayed on the external electronic device 102, the electronic device 101 may transmit information related to the shared screen to the external electronic device 102.

According to an embodiment of the disclosure, the information related to the shared screen may include information for mirroring the screen displayed in the exposed area of the flexible display of the electronic device 101. According to an embodiment of the disclosure, the information related to the shared screen may further include size information about the shared screen for extending the flexible display of the external electronic device 102 based on the size of the shared screen. According to an embodiment of the disclosure, the electronic device 101 may transmit, to the external electronic device 102, a control command for controlling the flexible display of the external electronic device 102 to be extended based on the size of the shared screen. Accordingly, the degree of extension of the flexible display of the external electronic device 102 may be determined based on the size of the shared screen displayed in the extended second area of the electronic device 101.

According to an embodiment of the disclosure, when the information related to the shared screen includes a control command for controlling whether to extend the flexible display of the external electronic device 102, the external electronic device 102 may notify that the flexible display may be extended or shrunken, or may display a UI 1020 for requesting user confirmation.

Referring to FIG. 10B, when mirroring of the extended area is mirrored between rollable electronic devices, the mirrored rollable terminal may likewise perform mirroring only in the extended area. During such mirroring, the external electronic device 102 (e.g., a sink terminal) may perform mirroring while being extended in the same ratio as much as the extension ratio of the electronic device 101 (e.g., a source terminal) and, when such a sharing request is present, a dialog, a notification, or other various UIs (e.g., the UI of FIG. 10A) may be popped up to receive the user's confirmation.

According to an embodiment of the disclosure, the electronic device 101 may generate a new logical display area in an extended area 1030 and may display a shared screen 1040 with the external electronic device 102. According to an embodiment of the disclosure, the electronic device 101 may display a non-shared screen in an area other than the extended area 1030 of the exposed area of the flexible display and may use the non-shared screen independently from the shared screen 1040.

According to an embodiment of the disclosure, the external electronic device 102 may generate a new logical display area in an extended area 1031 and may display the shared screen 1050, based on the information about the shared screen received from the electronic device 101. According to an embodiment of the disclosure, the external electronic device 102 may display the non-shared screen in the area other than the extended area 1031 of the exposed area of the flexible display and may use the non-shared screen independently from the shared screen 1050.

This mirroring between rollable devices enables chatting while the content is simultaneously viewed or allows the electronic device to be continuously used, thus providing better usability than mirroring of the related art, and it is more efficient in sharing some content in real-time because it does not have data to store unlike the method of the related art of transmitting data.

According to an embodiment of the disclosure, if a set input is received, the electronic device 101 may switch the screen displayed in the first area which is the existing area and the screen displayed in the second area which is the extended area. For example, when an operation of touching the first area and swiping in the direction in which the second area is positioned or an operation of touching the second area and swiping in the direction in which the first area is positioned is received, the electronic device may switch the position of the screen displayed in the first area and the position of the screen displayed in the second area.

Figure 11A:
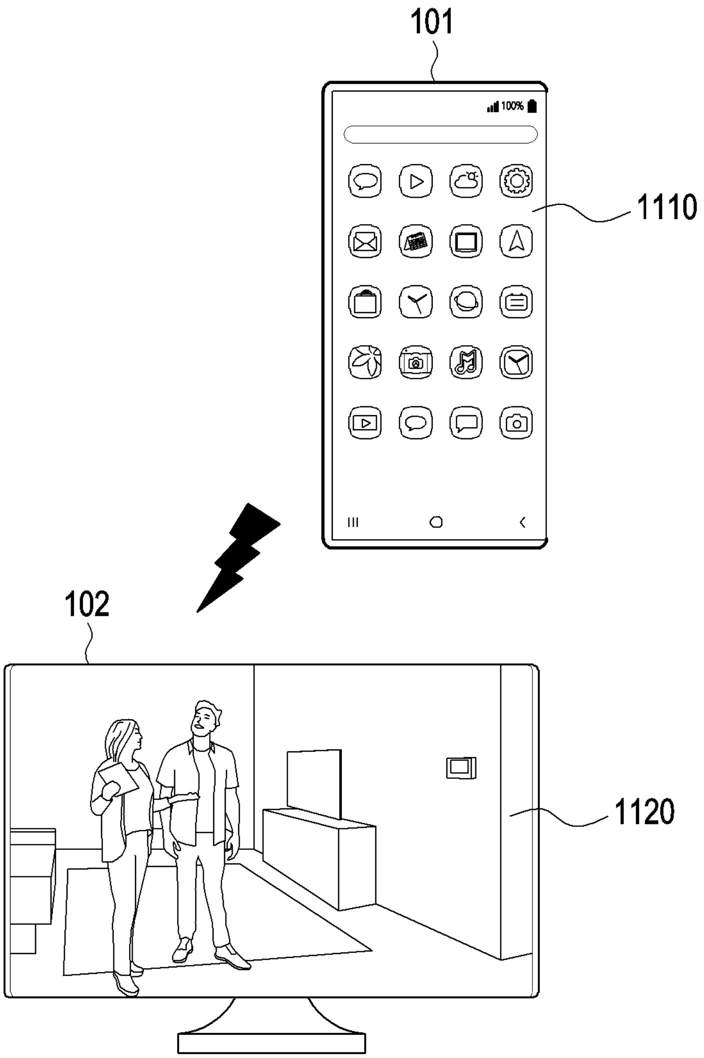
FIG. 11A is a view illustrating an operation of displaying a non-shared screen in a closed state of an electronic device and an external electronic device according to an embodiment of the disclosure.

FIG. 11A is a view illustrating an operation of displaying a non-shared screen in a closed state of an electronic device and an external electronic device according to an embodiment of the disclosure.

Figure 11B:
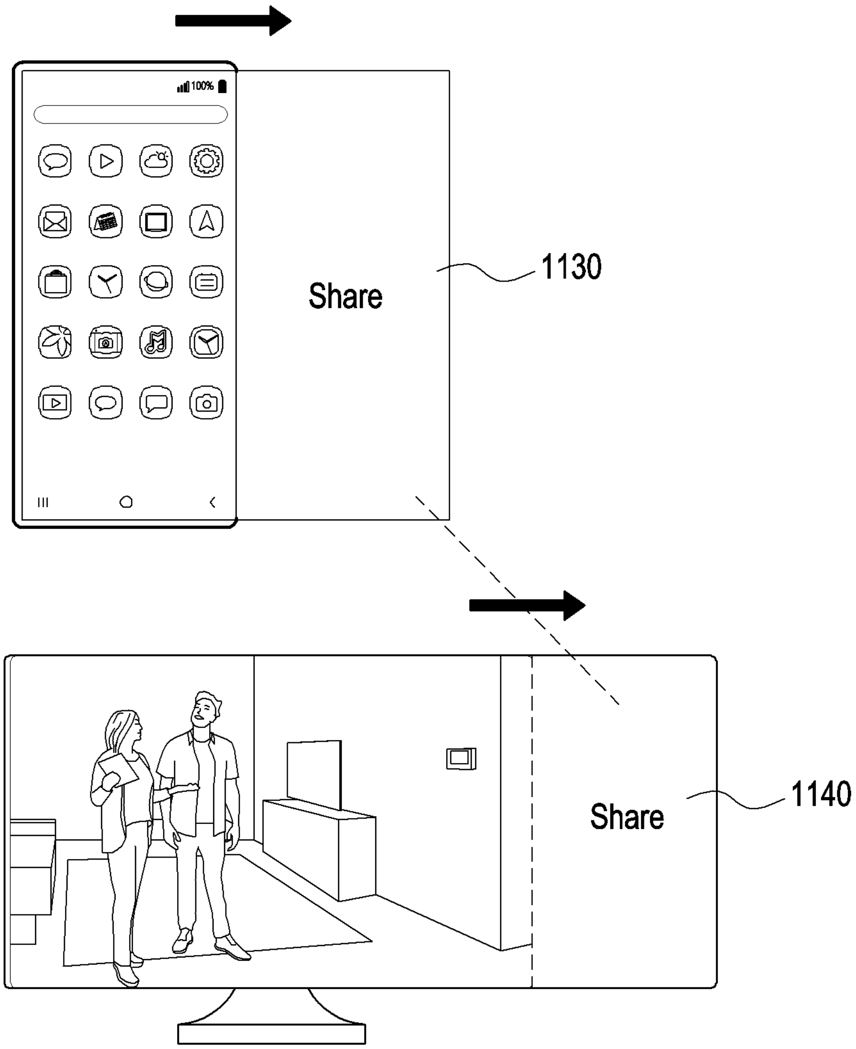
FIG. 11B is a view illustrating an operation of displaying a non-shared screen and a shared screen in an open state of an electronic device and an external electronic device according to an embodiment of the disclosure.

FIG. 11B is a view illustrating an operation of displaying a non-shared screen and a shared screen in an open state of an electronic device and an external electronic device according to an embodiment of the disclosure.

Referring to FIG. 11A, even when the electronic device 101 and the external electronic device 102 are different types of devices, a display area 1110 or 1120 previously viewed may be maintained, and the display area may be newly configured only in the extended area to share a screen. For example, the electronic device 101 may be a rollable mobile device, and the external electronic device 102 may be a rollable TV.

According to an embodiment of the disclosure, even when the ratio or length of the extended area of the flexible display of the external electronic device 102 (e.g., a sink terminal) is adjusted, adjustment or synchronization may be possible in the electronic device 101 (e.g., a source terminal). According to an embodiment of the disclosure, both the electronic device 101 (e.g., a source terminal) that transmits mirroring and the external electronic device 102 (e.g., a sink terminal) that receives mirroring may be able to share the full screen.

Referring to FIG. 11B, the external electronic device 102 (e.g., a TV) may receive information related to the shared screen 1130 from the electronic device 101 and may display a screen 1140 corresponding to the shared screen. For example, when the shared screen 1130 displayed on the electronic device 101 is a built-in display screen, the external electronic device 102 may display the same screen 1140 as the shared screen 1130, and when the shared screen 1130 displayed on the electronic device 101 is a virtual display screen, the external electronic device 102 may display a different screen 1140 depending on the type (e.g., tablet, PC, TV) of the external electronic device 102 or the operating system, while the shared screen 1130 and the performed function and the displayed content are shared with the electronic device 101.

According to an embodiment of the disclosure, if a set input is received, the electronic device may switch the screen displayed in the first area and the screen displayed in the second area. For example, when an operation of touching the first area and swiping in the direction in which the second area is positioned or an operation of touching the second area and swiping in the direction in which the first area is positioned is received, the electronic device may switch the position of the screen displayed in the first area and the position of the screen displayed in the second area.

Figure 12A:
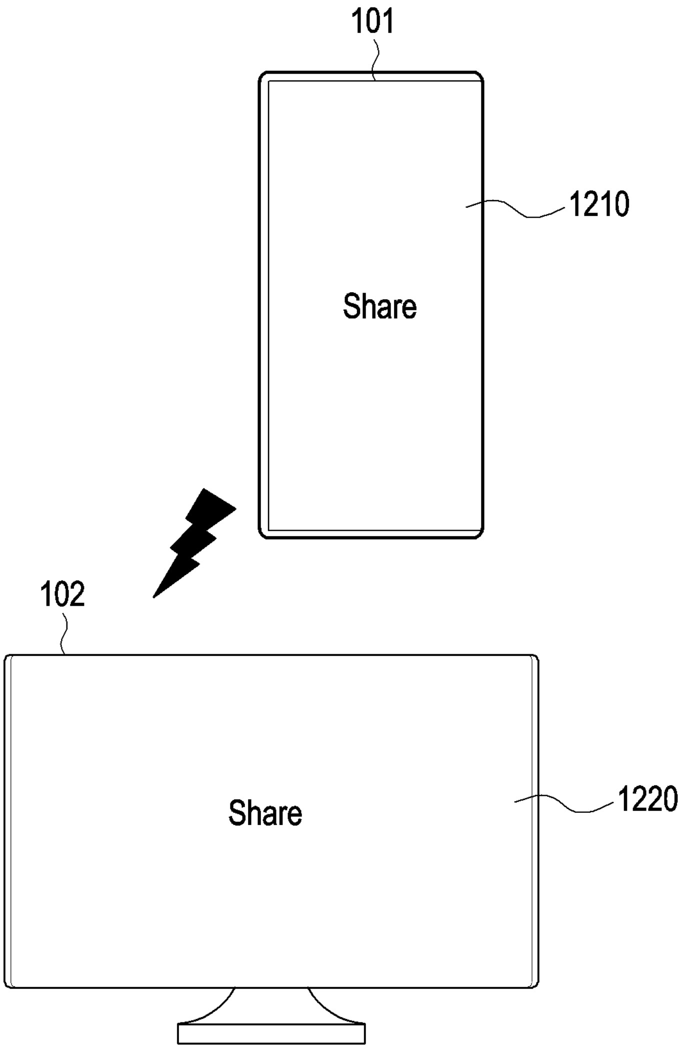
FIG. 12A is a view illustrating an operation of displaying a shared screen in a closed state of an electronic device and an external electronic device according to an embodiment of the disclosure.

FIG. 12A is a view illustrating an operation of displaying a shared screen in a closed state of an electronic device and an external electronic device according to an embodiment of the disclosure.

Figure 12B:
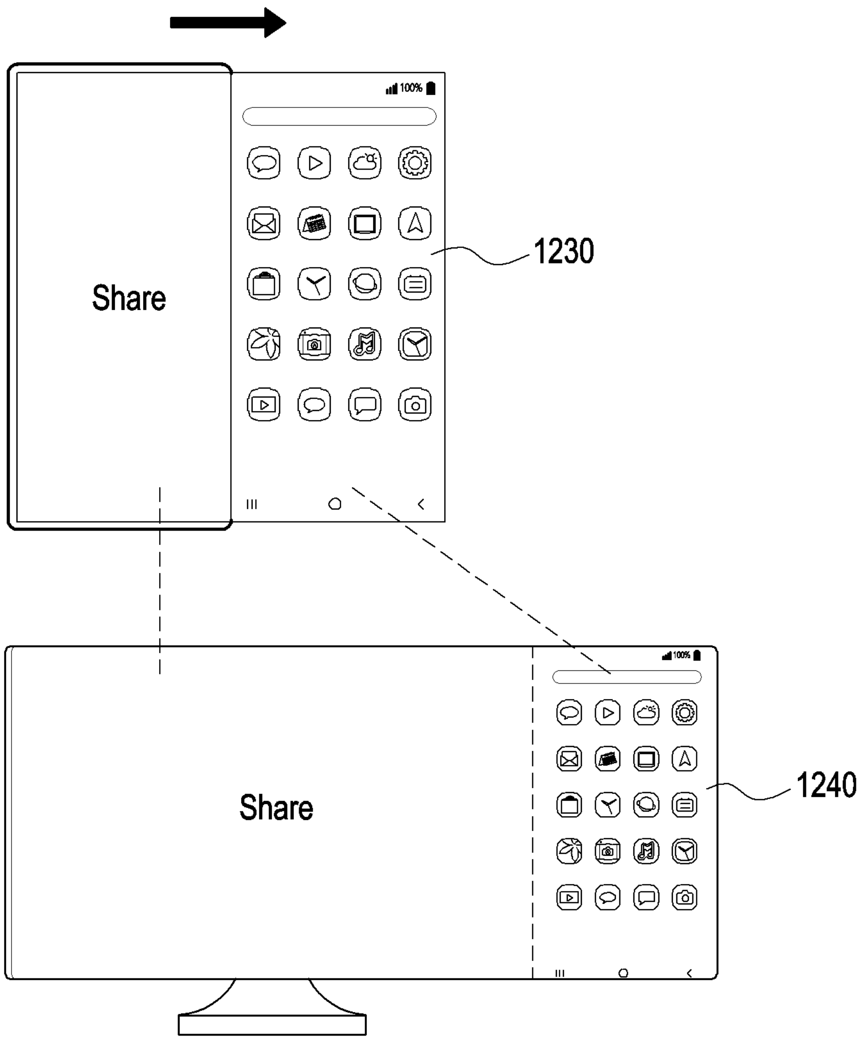
FIG. 12B is a view illustrating an operation of displaying a non-shared screen and a shared screen in an open state of an electronic device and an external electronic device according to an embodiment of the disclosure.

FIG. 12B is a view illustrating an operation of displaying a non-shared screen and a shared screen in an open state of an electronic device and an external electronic device according to an embodiment of the disclosure.

According to an embodiment of the disclosure, if the exposed area of the flexible display is extended, the electronic device may display a first shared screen in the first area and may display a second shared screen in the second area.

Referring to FIG. 12A, in a state in which both the electronic device 101 (e.g., a rollable mobile device) and the external electronic device 102 (e.g., a rollable TV) are implemented to be configured with two display areas, screens in the two display areas of the electronic device 101 (e.g., a rollable mobile device (source)) may be simultaneously shared. According to an embodiment of the disclosure, if the flexible display of the electronic device 101 performs a slide-in operation, the external electronic device 102 (e.g., a rollable TV) may also perform a slide-in operation, and the shared screen 1210 or 1220 displayed in the shared first area may be maintained. According to an embodiment of the disclosure, when only the electronic device 101 performs a slide-in operation, the display area (e.g., a logical display) of the external electronic device 102 may be changed from two to one, and the shared screen 1220 with the electronic device may be displayed as the full screen.

Referring to FIG. 12B, the external electronic device 102 (e.g., a TV) may receive information related to a second shared screen 1230 newly shared based on the slide-out operation from the electronic device 101, and may display a screen 1240 corresponding to the second shared screen 1230. For example, when the second shared screen 1230 displayed on the electronic device 101 is a built-in display screen, the external electronic device 102 may display the same screen 1240 as the second shared screen 1230, and when the second shared screen 1230 displayed on the electronic device 101 is a virtual display screen, the external electronic device 102 may display a different screen 1240 depending on the type (e.g., tablet, PC, TV) of the external electronic device or the operating system, while the second shared screen 1230 and the performed function and the displayed content are shared with the electronic device.

According to an embodiment of the disclosure, if a set input is received, the electronic device may switch the screen displayed in the first area and the screen displayed in the second area. For example, when an operation of touching the first area and swiping in the direction in which the second area is positioned or an operation of touching the second area and swiping in the direction in which the first area is positioned is received, the electronic device may switch the position of the screen displayed in the first area and the position of the screen displayed in the second area.

According to an embodiment of the disclosure, an electronic device may comprise a first housing, a second housing disposed to be movable with respect to the first housing, a rollable display inserted into or drawn out of the first housing based on slide-in or slide-out of the second housing, a motor driving module disposed inside the first housing or the second housing and configured to move the second housing in a first direction or a second direction, a communication module, memory storing instructions, and at least one processor operably connected to the first housing, the second housing, the rollable display, the motor driving module, the communication module, and the memory.

According to an embodiment of the disclosure, the at least one processor may be configured to display a first screen in an exposed area of the rollable display.

According to an embodiment of the disclosure, the at least one processor may be configured to move the second housing in the second direction so that the exposed area of the rollable display is extended.

According to an embodiment of the disclosure, the at least one processor may be configured to display a shared screen shared with an external electronic device in a first area corresponding to an exposed area before the rollable display is extended, of the extended exposed area, based on a user input received through the first screen.

According to an embodiment of the disclosure, the at least one processor may be configured to transmit information related to the shared screen to the external electronic device through the communication module.

According to an embodiment of the disclosure, the at least one processor may display a non-shared screen in a second area of the extended exposed area other than the first area.

According to an embodiment of the disclosure, the information related to the shared screen may include size information about the shared screen for extending a rollable display of the external electronic device based on a size of the shared screen.

According to an embodiment of the disclosure, the at least one processor may display a first shared screen in the first area, and display a second shared screen in a second area of the extended exposed area other than the first area.

According to an embodiment of the disclosure, the at least one processor may switch a screen displayed in the first area and a screen displayed in the second area if a set input is received.

According to an embodiment of the disclosure, a method of controlling an electronic device including a first housing, a second housing disposed to be movable with respect to the first housing, and a rollable display inserted into or drawn out of the first housing, based on slide-in or slide-out of the second housing, may comprise displaying a first screen in an exposed area of the rollable display.

According to an embodiment of the disclosure, the method for controlling the electronic device may comprise moving the second housing in a second direction so that the exposed area of the rollable display is extended.

According to an embodiment of the disclosure, the method for controlling the electronic device may comprise displaying a shared screen shared with an external electronic device in a first area corresponding to an exposed area before the rollable display is extended, of the extended exposed area, based on a user input received through the first screen.

According to an embodiment of the disclosure, the method for controlling the electronic device may comprise transmitting information related to the shared screen to the external electronic device.

According to an embodiment of the disclosure, the displaying may display a non-shared screen in a second area of the extended exposed area other than the first area.

According to an embodiment of the disclosure, the information related to the shared screen may include size information about the shared screen for extending a rollable display of the external electronic device based on a size of the shared screen.

According to an embodiment of the disclosure, the displaying may display a first shared screen in the first area, and display a second shared screen in a second area of the extended exposed area other than the first area.

According to an embodiment of the disclosure, the method may further comprise switching a screen displayed in the first area and a screen displayed in the second area if a set input is received.

According to an embodiment of the disclosure, an electronic device may comprise a first housing, a second housing disposed to be movable with respect to the first housing, a rollable display inserted into or drawn out of the first housing based on slide-in or slide-out of the second housing, a motor driving module disposed inside the first housing or the second housing and configured to move the second housing in a first direction or a second direction, a communication module, memory storing instructions, and at least one processor operably connected to the first housing, the second housing, the rollable display, the motor driving module, the communication module, and the memory.

According to an embodiment of the disclosure, the at least one processor may be configured to display a first screen in an exposed area of the rollable display.

According to an embodiment of the disclosure, the at least one processor may be configured to move the second housing in the second direction so that the exposed area of the rollable display is extended.

According to an embodiment of the disclosure, the at least one processor may be configured to display a shared screen shared with an external electronic device in a second area other than a first area corresponding to an exposed area before the rollable display is extended, of the extended exposed area, based on a user input received through the first screen.

According to an embodiment of the disclosure, the at least one processor may be configured to transmit information related to the shared screen to the external electronic device through the communication module.

According to an embodiment of the disclosure, the at least one processor may be configured to display a non-shared screen in the first area.

According to an embodiment of the disclosure, the information related to the shared screen may include size information about the shared screen for extending a rollable display of the external electronic device based on a size of the shared screen.

According to an embodiment of the disclosure, the at least one processor may be configured to switch a screen displayed in the first area and a screen displayed in the second area if a set input is received.

According to an embodiment of the disclosure, a method of controlling an electronic device including a first housing, a second housing disposed to be movable with respect to the first housing, and a rollable display inserted into or drawn out of the first housing, based on slide-in or slide-out of the second housing, may comprise displaying a first screen in an exposed area of the rollable display.

According to an embodiment of the disclosure, the method for controlling the electronic device may comprise moving the second housing in a second direction so that the exposed area of the rollable display is extended.

According to an embodiment of the disclosure, the method for controlling the electronic device may comprise displaying a shared screen shared with an external electronic device in a second area other than a first area corresponding to an exposed area before the rollable display is extended, of the extended exposed area, based on a user input received through the first screen.

According to an embodiment of the disclosure, the method for controlling the electronic device may comprise transmitting information related to the shared screen to the external electronic device.

According to an embodiment of the disclosure, the displaying may display a non-shared screen in the first area.

According to an embodiment of the disclosure, the information related to the shared screen may include size information about the shared screen for extending a rollable display of the external electronic device based on a size of the shared screen.

According to an embodiment of the disclosure, the method for controlling the electronic device may further comprise switching a screen displayed in the first area and a screen displayed in the second area if a set input is received.

According to an embodiment of the disclosure, in a non-transitory computer-readable recording medium storing one or more programs, the one or more programs may be configured to, when executed by at least one processor of an electronic device including a first housing, a second housing disposed to be movable with respect to the first housing, a rollable display inserted into or drawn out of the first housing based on slide-in or slide-out of the second housing, a motor driving module disposed inside the first housing or the second housing and configured to move the second housing in a first direction or a second direction, a communication module, memory storing instructions, and at least one processor operably connected to the first housing, the second housing, the rollable display, the motor driving module, the communication module, and the memory, enable the electronic device to display a first screen in an exposed area of the rollable display.

According to an embodiment of the disclosure, the one or more programs may be configured to enable the electronic device to move the second housing in the second direction so that the exposed area of the rollable display is extended.

According to an embodiment of the disclosure, the one or more programs may be configured to enable the electronic device to display a shared screen shared with an external electronic device in a first area corresponding to an exposed area before the rollable display is extended, of the extended exposed area, based on a user input received through the first screen.

According to an embodiment of the disclosure, the one or more programs may be configured to enable the electronic device to transmit information related to the shared screen to the external electronic device through the communication module.

According to an embodiment of the disclosure, the one or more programs may be configured to enable the electronic device to display a non-shared screen in a second area of the extended exposed area other than the first area.

According to an embodiment of the disclosure, the information related to the shared screen may include size information about the shared screen for extending a rollable display of the external electronic device based on a size of the shared screen.

According to an embodiment of the disclosure, the one or more programs may be configured to enable the electronic device to display a first shared screen in the first area, and display a second shared screen in a second area of the extended exposed area other than the first area.

According to an embodiment of the disclosure, the one or more programs may be configured to enable the electronic device to switch a screen displayed in the first area and a screen displayed in the second area if a set input is received.

According to an embodiment of the disclosure, in a non-transitory computer-readable recording medium storing one or more programs, the one or more programs may be configured to, when executed by at least one processor of an electronic device including a first housing, a second housing disposed to be movable with respect to the first housing, a rollable display inserted into or drawn out of the first housing based on slide-in or slide-out of the second housing, a motor driving module disposed inside the first housing or the second housing and configured to move the second housing in a first direction or a second direction, a communication module, memory storing instructions, and at least one processor operably connected to the first housing, the second housing, the rollable display, the motor driving module, the communication module, and the memory, enable the electronic device to display a first screen in an exposed area of the rollable display.

According to an embodiment of the disclosure, the one or more programs may be configured to enable the at least one processor to move the second housing in the second direction so that the exposed area of the rollable display is extended.

According to an embodiment of the disclosure, the one or more programs may be configured to enable the at least one processor to display a shared screen shared with an external electronic device in a second area other than a first area corresponding to an exposed area before the rollable display is extended, of the extended exposed area, based on a user input received through the first screen.

According to an embodiment of the disclosure, the one or more programs may be configured to enable the electronic device to transmit information related to the shared screen to the external electronic device through the communication module.

According to an embodiment of the disclosure, the one or more programs may be configured to enable the electronic device to display a non-shared screen in the first area.

According to an embodiment of the disclosure, the information related to the shared screen may include size information about the shared screen for extending a rollable display of the external electronic device based on a size of the shared screen.

According to an embodiment of the disclosure, the one or more programs may be configured to enable the electronic device to switch a screen displayed in the first area and a screen displayed in the second area if a set input is received.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

An embodiment of the disclosure and terms used therein are not intended to limit the technical features described in the disclosure to specific embodiments of the disclosure, and should be understood to include various modifications, equivalents, or substitutes of the embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment of the disclosure, each component (e.g., a module or a program) of the above-described components may include a single entity or multiple entities. Some of the plurality of entities may be separately disposed in different components. According to an embodiment of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a first housing;

a second housing disposed to be movable with respect to the first housing;

a flexible display including a first area and a second area, wherein, in a first state, the first area is exposed and the second area is inserted into the first housing based on slide-in of the second housing, and in a second state, the first area and the second area is exposed based on slide-out of the second housing;

a motor driving module disposed inside the first housing or the second housing and configured to move the second housing in a first direction or a second direction;

communication circuitry;

at least one processor; and memory, comprising one or more storage media, storing instructions, wherein the instructions, when executed by the at least one processor individually or collectively, cause the electronic device to:

display a first screen in the first area of the flexible display in the first state, move the second housing in the second direction to further expose the second area so that a state of the flexible display is changed from the first state to the second state, display a shared screen shared with an external electronic device in the first area in the second state, based on a user input received through the first screen, wherein the first area is set by the user to display the shared screen in the second state, and transmit information related to the shared screen to the external electronic device through the communication circuitry.

2. The electronic device of claim 1, wherein the instructions, when executed by the at least one processor individually or collectively, further cause the electronic device to display a non-shared screen in the second area in the second state.

3. The electronic device of claim 1, wherein the information related to the shared screen includes size information about the shared screen for extending a flexible display of the external electronic device based on a size of the shared screen.

4. The electronic device of claim 1, wherein the instructions, when executed by the at least one processor individually or collectively, further cause the electronic device to:

display a first shared screen in the first area in the second state, and display a second shared screen in the second area in the second state.

5. The electronic device of claim 2, wherein the instructions, when executed by the at least one processor individually or collectively, further cause the electronic device to switch a screen displayed in the first area and a screen displayed in the second area when a set input is received.

6. A method of controlling an electronic device including a first housing, a second housing disposed to be movable with respect to the first housing, and a flexible display including a first area and a second area, wherein, in a first state, the first area is exposed and the second area is inserted into the first housing, based on slide-in of the second housing, and in a second state, the first area and the second area is exposed based on slide-out of the second housing, the method comprising:

displaying a first screen in the first area of the flexible display in the first state;

moving the second housing in a second direction to further expose the second area so that a state of the flexible display is changed from the first state to the second state;

displaying a shared screen shared with an external electronic device in the first area in the second state, based on a user input received through the first screen, wherein the first area is set by the user to display the shared screen in the second state; and transmitting information related to the shared screen to the external electronic device.

7. The method of claim 6, wherein the displaying of the shared screen includes displaying a non-shared screen in the second area in the second state.

8. The method of claim 6, wherein the information related to the shared screen includes size information about the shared screen for extending a flexible display of the external electronic device based on a size of the shared screen.

9. The method of claim 6, wherein the displaying of the first screen includes:

displaying a first shared screen in the first area in the second state; and displaying a second shared screen in the second area in the second state.

10. The method of claim 7, further comprising:

switching a screen displayed in the first area and a screen displayed in the second area when a set input is received.

11. One or more non-transitory computer-readable storage media storing computer-executable instructions that, when executed by one or more processors individually or collectively, cause an electronic device to perform operations of controlling the electronic device including a first housing, a second housing disposed to be movable with respect to the first housing, and a flexible display including a first area and a second area, wherein, in a first state, the first area is exposed and the second area is inserted into the first housing, based on slide-in of the second housing, and in a second state, the first area and the second area is exposed based on slide-out of the second housing, the operations comprising:

displaying a first screen in the first area of the flexible display in the first state;

moving the second housing in a second direction to further expose the second area so that a state of the flexible display is changed from the first state to the second state;

displaying a shared screen shared with an external electronic device in the first area in the second state, based on a user input received through the first screen, wherein the first area is set by the user to display the shared screen in the second state; and transmitting information related to the shared screen to the external electronic device.

12. The one or more non-transitory computer-readable storage media of claim 11, wherein the displaying of the first screen includes displaying a non-shared screen in a second area of extended exposed area other than the first area.

13. The one or more non-transitory computer-readable storage media of claim 11, wherein the information related to the shared screen includes size information about the shared screen for extending a flexible display of the external electronic device based on a size of the shared screen.

14. The one or more non-transitory computer-readable storage media of claim 11, wherein the displaying of the first screen includes:

displaying a first shared screen in the first area in the second state; and displaying a second shared screen in the second area in the second state.

15. The one or more non-transitory computer-readable storage media of claim 12, the operations further comprising:

switching a screen displayed in the first area and a screen displayed in the second area when a set input is received.

16. An electronic device, comprising:

a first housing;

a second housing disposed to be movable with respect to the first housing;

a flexible display including a first area and a second area, wherein, in a first state, the first area is exposed and the second area is inserted into the first housing based on slide-in of the second housing, and in a second state, the first area and the second area is exposed based on slide-out of the second housing;

a motor driving module disposed inside the first housing or the second housing and configured to move the second housing in a first direction or a second direction;

communication circuitry;

at least one processor; and memory, comprising one or more storage media, storing instructions, wherein the instructions, when executed by the at least one processor individually or collectively, cause the electronic device to:

display a first screen in the first area of the flexible display in the first state, move the second housing in the second direction to further expose the second area so that a state of the flexible display is changed from the first state to the second state, based on an user input received through the first screen, display a shared screen shared with an external electronic device in the second area in the second state, wherein the second area is set by the user to display the shared screen in the second state, and transmit information related to the shared screen to the external electronic device through the communication circuitry.

17. The electronic device of claim 16, wherein instructions, when executed by the at least one processor individually or collectively, further cause the electronic device to, displays a non-shared screen in the first area in the second state.

18. The electronic device of claim 16, wherein the information related to the shared screen includes size information of the shared screen for allowing a flexible display of the external electronic device to be expanded based on the size of the shared screen.

19. The electronic device of claim 16, wherein instructions, when executed by the at least one processor individually or collectively, further cause the electronic device to, based on a set input being received, switch a screen displayed in the first area and a screen displayed in the second area.

20. A method of controlling an electronic device including a first housing, a second housing disposed to be movable with respect to the first housing, and a flexible display including a first area and a second area, wherein, in a first state, the first area is exposed and the second area is inserted into the first housing based on slide-in of the second housing, and in a second state, the first area and the second area is exposed based on slide-out of the second housing, the method comprising:

displaying a first screen in the first area of the flexible display in the first state;

moving the second housing in a second direction to further expose the second area so that a state of the flexible display is changed from the first state to the second state;

based on an user input received through the first screen, displaying a shared screen shared with an external electronic device in the second area in the second state, wherein the second area is set by the user to display the shared screen in the second state; and transmitting information related to the shared screen to the external electronic device.

* * * * *